(12) United States Patent
Kaga

(10) Patent No.: US 7,566,509 B2
(45) Date of Patent: Jul. 28, 2009

(54) TUBULAR FUEL CELL AND METHOD OF PRODUCING THE SAME

(75) Inventor: Yasuo Kaga, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 777 days.

(21) Appl. No.: 10/989,419

(22) Filed: Nov. 17, 2004

(65) Prior Publication Data

US 2005/0208355 A1 Sep. 22, 2005

(30) Foreign Application Priority Data

Nov. 18, 2003 (JP) ............................. 2003-388532
May 13, 2004 (JP) ............................. 2004-143215

(51) Int. Cl.
H01M 8/12 (2006.01)
H01M 8/24 (2006.01)
H01M 4/86 (2006.01)

(52) U.S. Cl. ............................. 429/31; 429/32; 429/40; 429/44

(58) Field of Classification Search ........................ None
See application file for complete search history.

(56) References Cited

U.S. PATENT DOCUMENTS

2002/0098404 A1* 7/2002 Shibata et al. ................. 429/40

FOREIGN PATENT DOCUMENTS

| JP | 52-21743 A | 2/1977 |
|---|---|---|
| JP | 64-043973 A | 2/1989 |
| JP | 06-029024 A | 2/1994 |
| JP | 6-77161 U | 10/1994 |
| JP | 8-106916 A | 4/1996 |
| JP | 8-162139 A | 6/1996 |
| JP | 8-222246 A | 8/1996 |
| JP | 09-171830 A | 6/1997 |
| JP | 11-073980 A | 3/1999 |
| JP | 11-111309 A | 4/1999 |

(Continued)

OTHER PUBLICATIONS

Power Generation with a Fuel Cell, edited by Specialized Committee for Researching Fuel Cell Operability of the Institute of Electrical Engineers of Japan, issued by Corona, 1994, pp. 76-80.

*Primary Examiner*—Jonathan Crepeau
(74) *Attorney, Agent, or Firm*—Birch, Stewart, Kolasch & Birch, LLP

(57) ABSTRACT

A porous metal IC membrane 2 is formed on a base tube 1, a fuel electrode 3 and a dense metal IC membrane 4 are formed to cover a part of the porous metal IC membrane 2, a solid electrolyte membrane 5 is formed on the fuel electrode 3 and the dense metal IC membrane 4 to entirely cover the fuel electrode 3 as well as to cover the periphery of the dense metal IC membrane 4, an air electrode 6 is formed on the solid electrolyte membrane 5 to cover a part of it, a porous metal IC membrane 7 is formed on the air electrode 6 to cover it as well as cover the exposed portion of the dense metal IC membrane 4, and further, exfoliation preventing membranes 8 are formed in the disconnected portions of the porous metal IC membrane 7 so as to cover the dense metal IC membrane 4.

9 Claims, 23 Drawing Sheets

FOREIGN PATENT DOCUMENTS

| | | |
|---|---|---|
| JP | 2002-56855 A | 2/2002 |
| JP | 2002-145658 A | 5/2002 |
| JP | 2002-289248 A | 10/2002 |
| JP | 2003-123787 A | 4/2003 |
| JP | 2003-317725 A | 11/2003 |
| JP | 2004-022471 A | 1/2004 |
| JP | 2005-149995 A | 6/2005 |

* cited by examiner

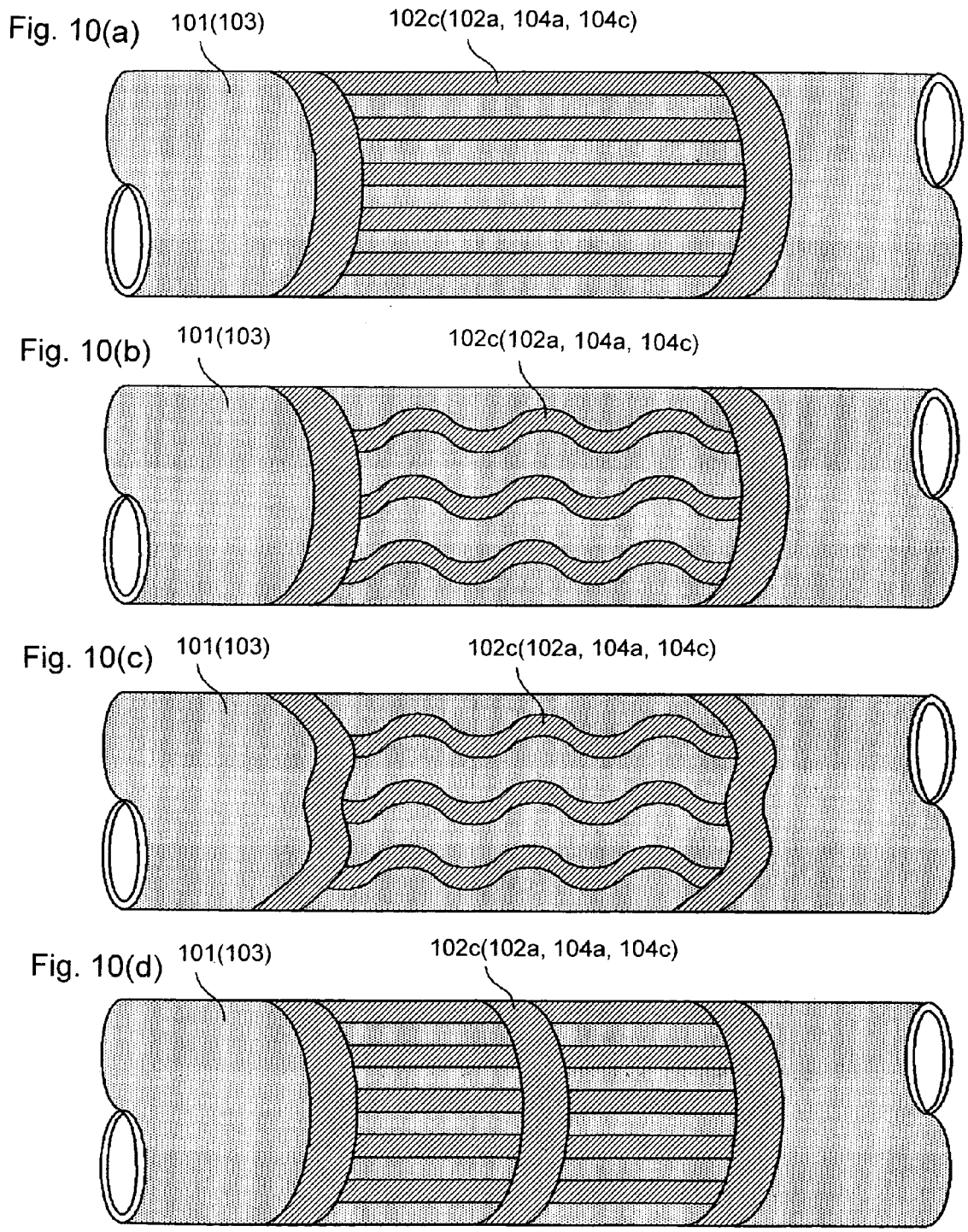

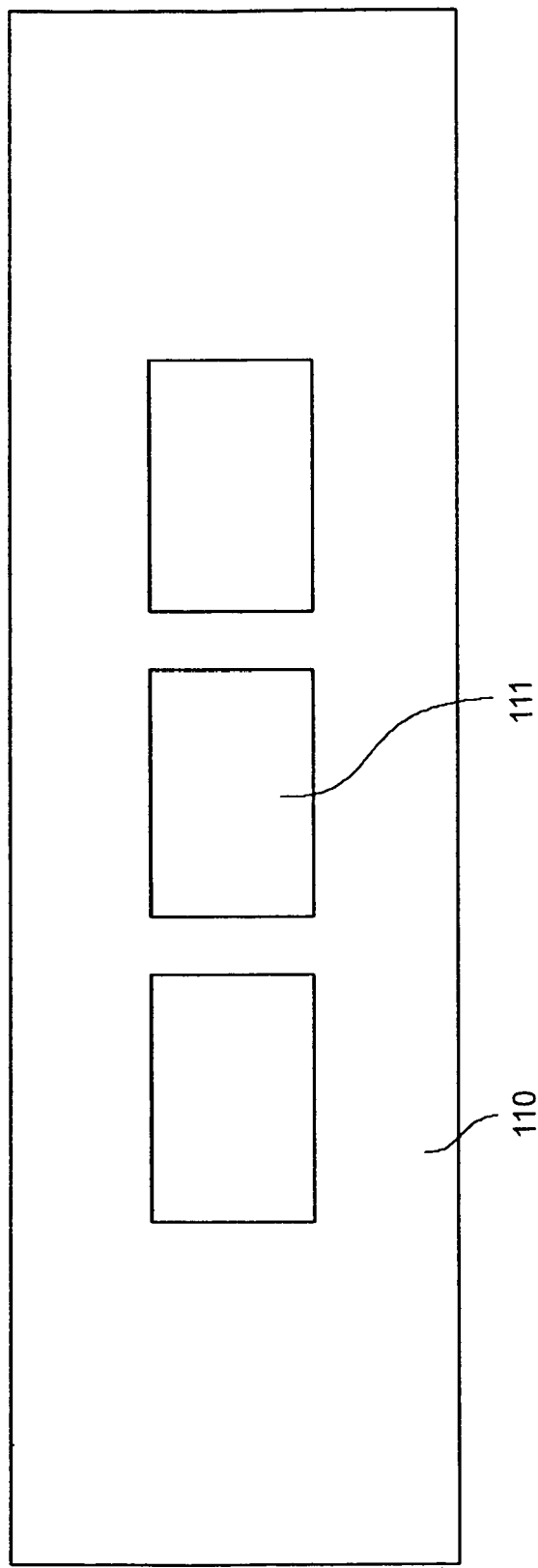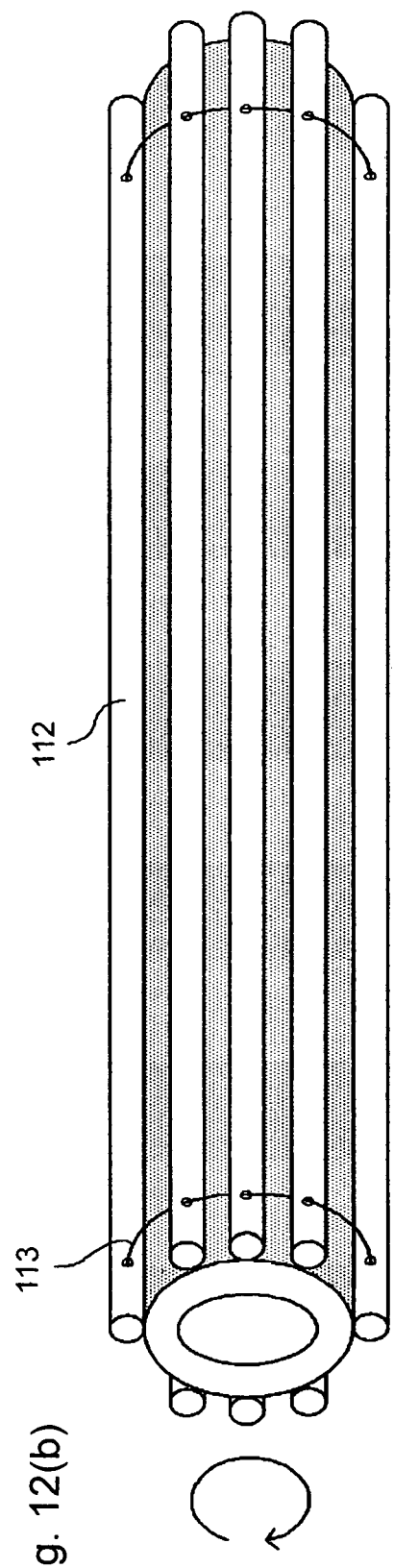
Fig. 12(a)
Fig. 12(b)

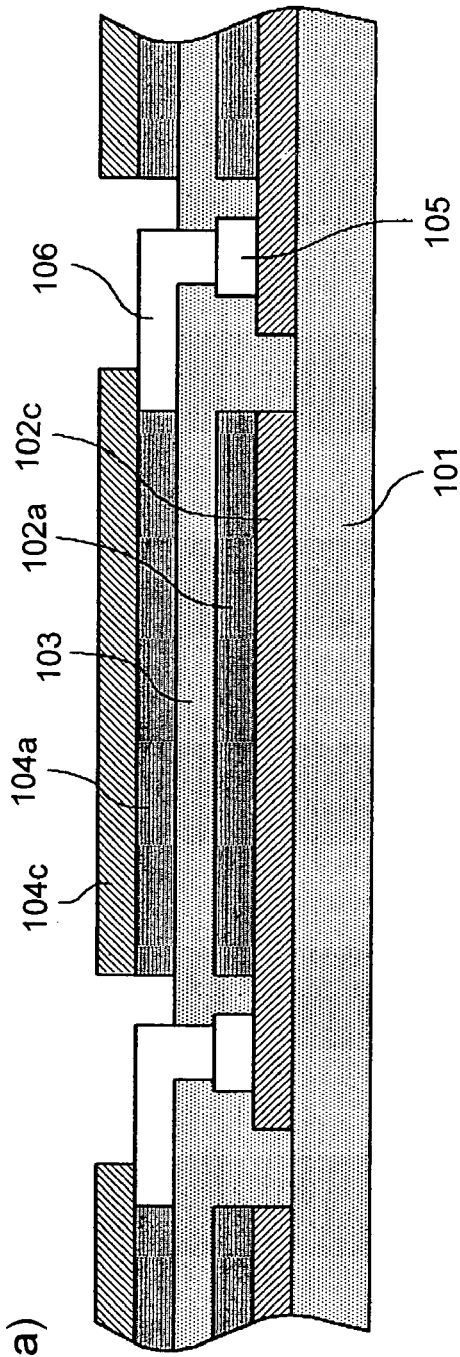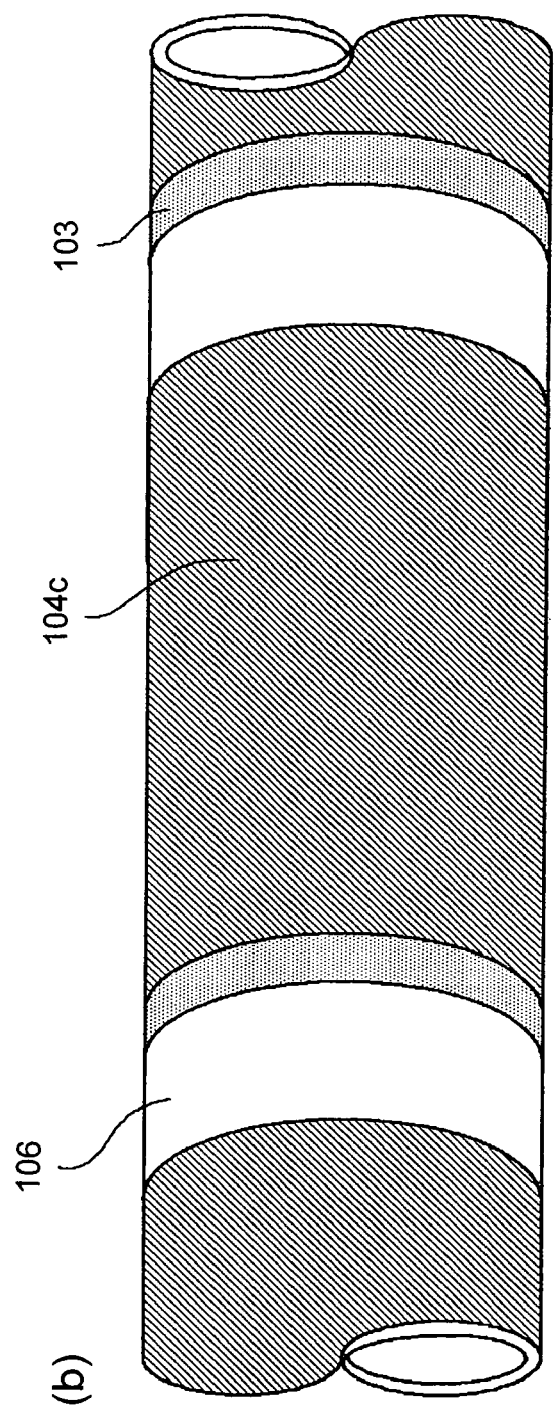

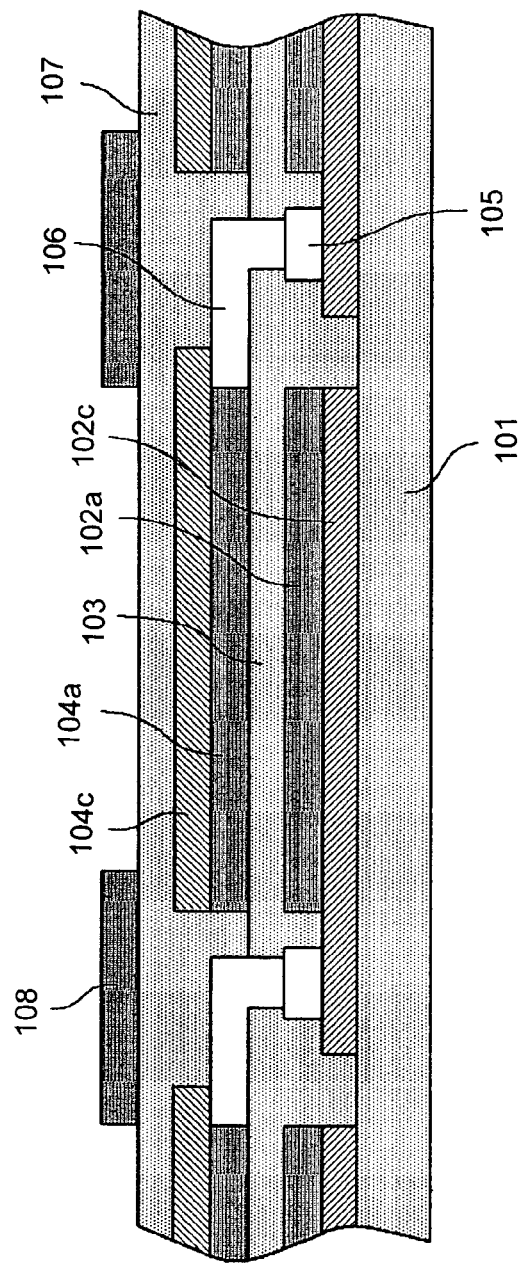
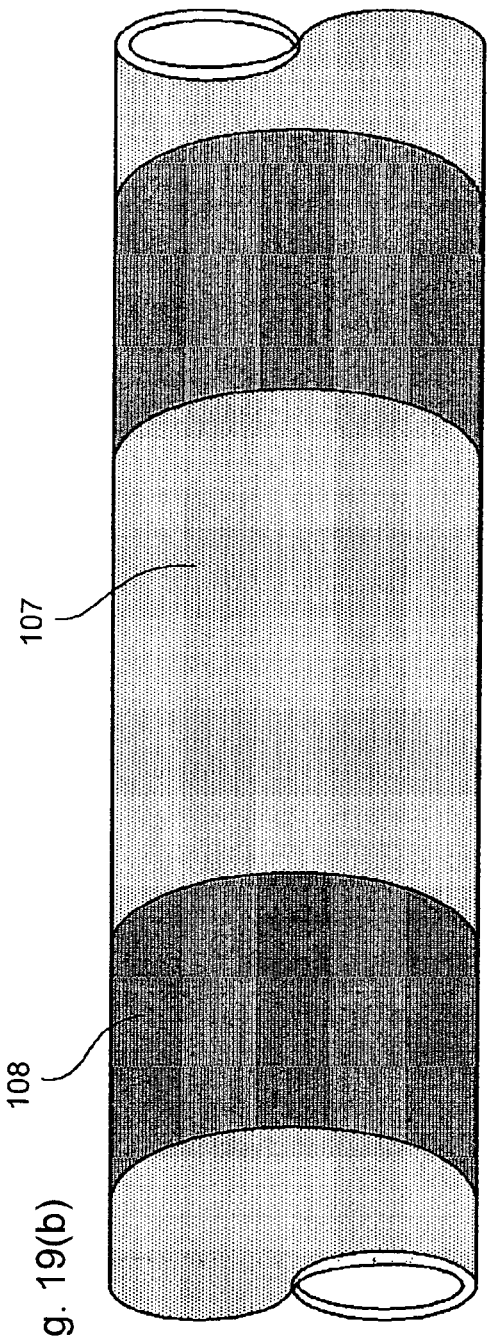
Fig. 19(a)
Fig. 19(b)

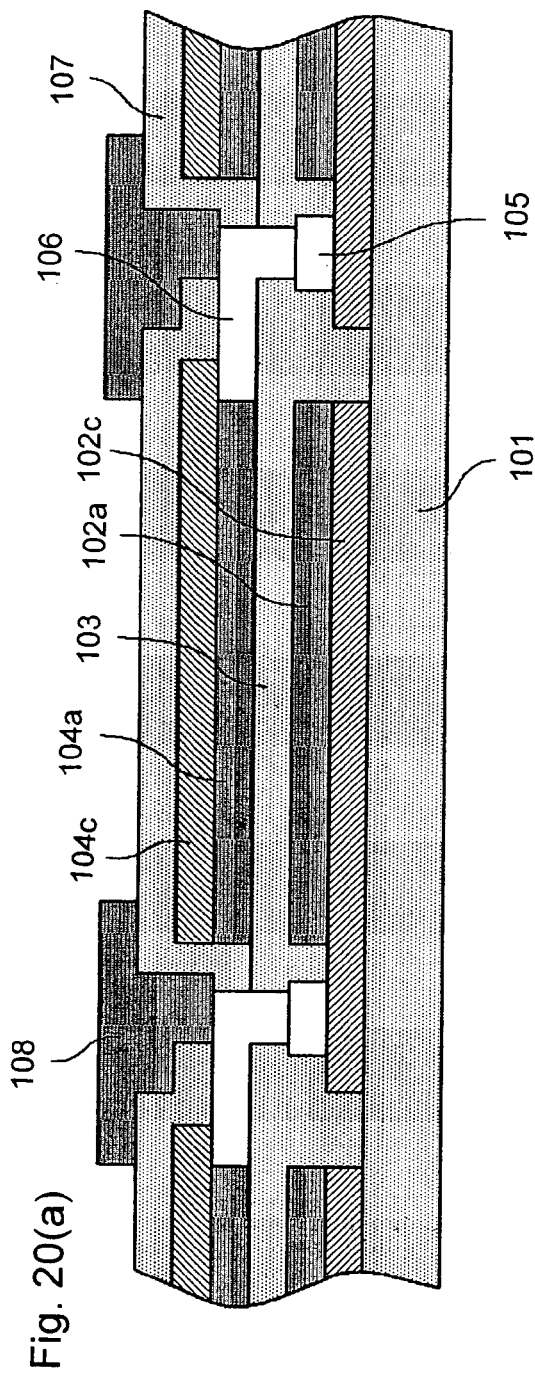
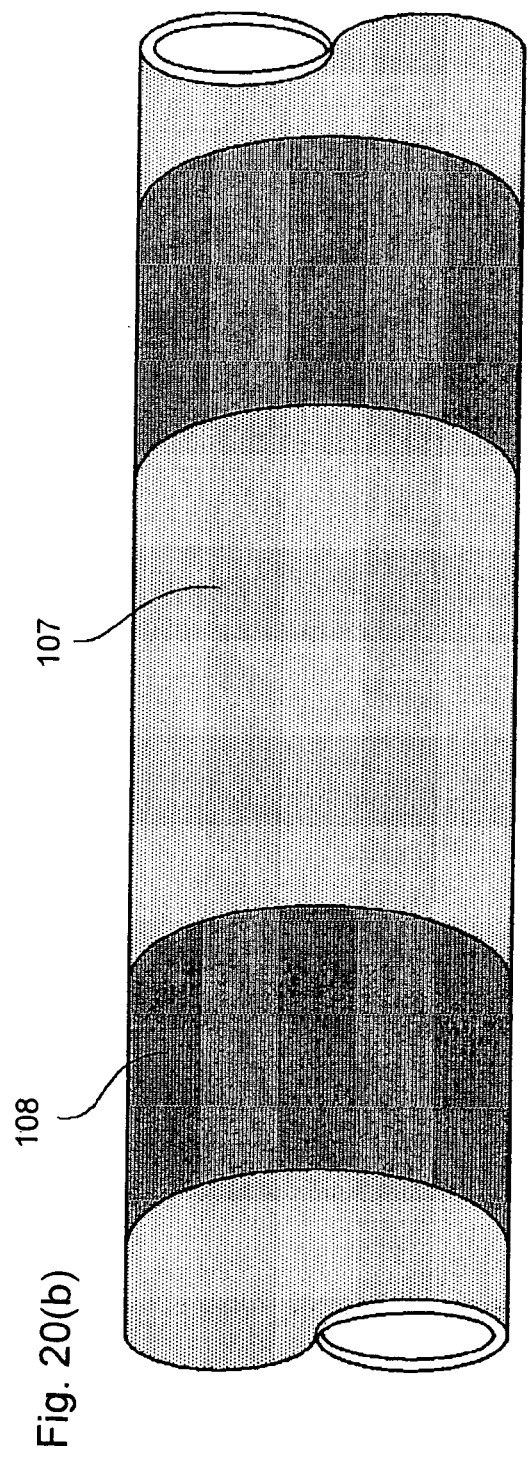
Fig. 20(a)
Fig. 20(b)

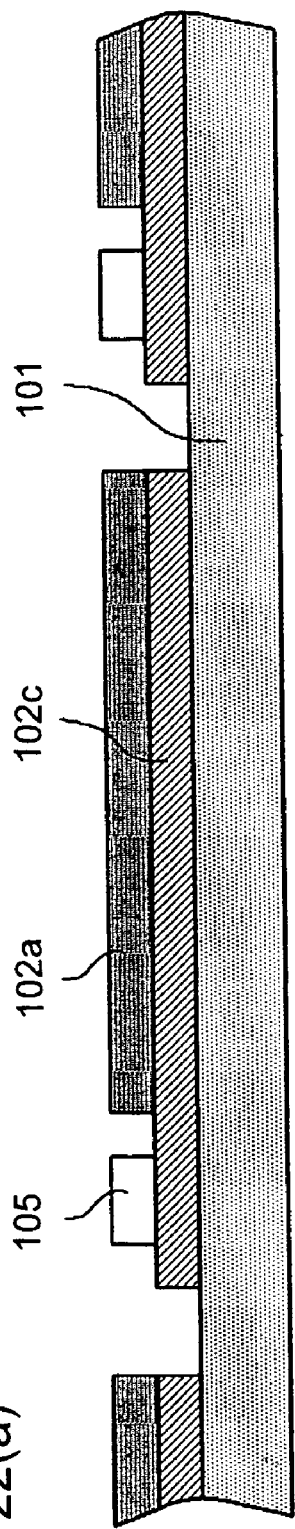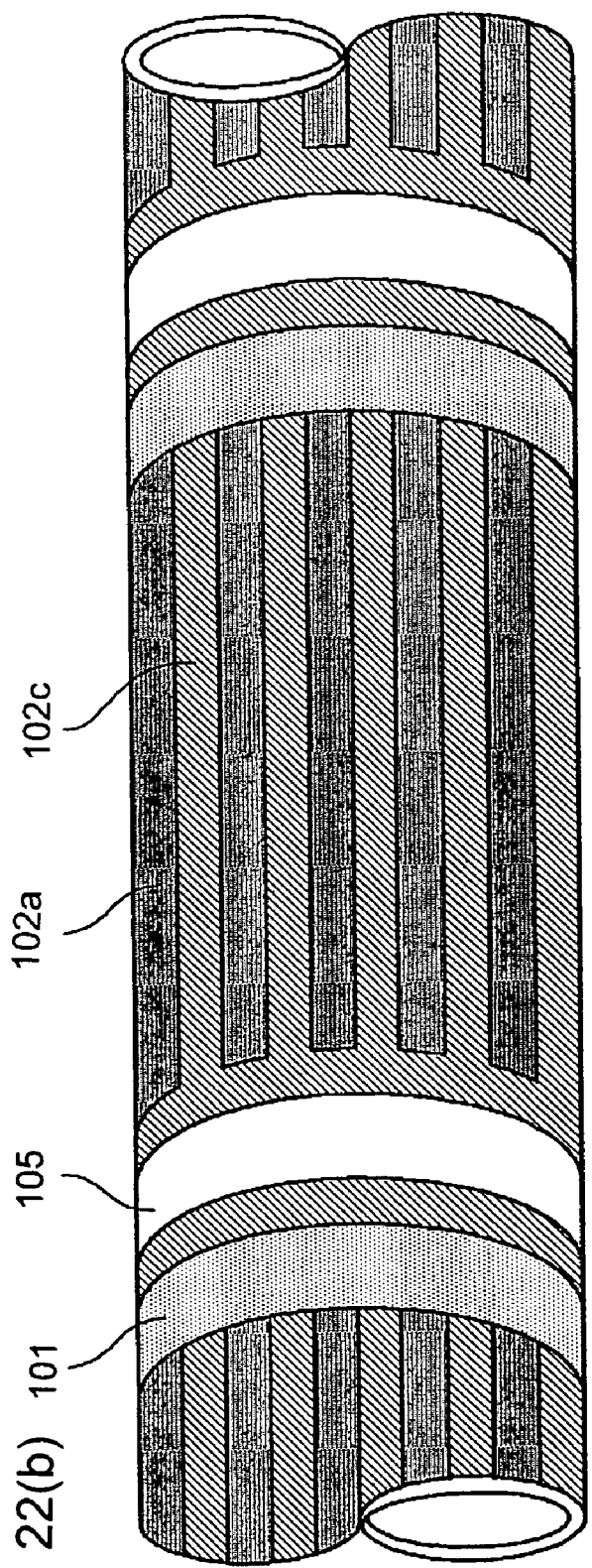

TUBULAR FUEL CELL AND METHOD OF PRODUCING THE SAME

FIELD OF THE INVENTION

The present invention relates to a tubular fuel cell; more particularly to a high-temperature solid-electrolyte fuel cell (hereinafter referred to as SOFC: solid oxide fuel cell) of a tubular series connection type (lateral stripe tubular type), using yttria-stabilized zirconia (YSZ) as an electrolyte, and a method of producing the same.

BACKGROUND OF THE INVENTION

Since a high-temperature solid-electrolyte fuel cell (SOFC) can execute a power generation process in a high temperature region, it is said that there can be realized not only a distributed power source of several hundred kilowatts but also a highly effective composite-type base load power generation plant combined with a gas turbine and a steam turbine, and having a large capacity of several hundred megawatts, by the fuel cell. A power generation system employing the SOFC is effective in energy conversion into electric energy; it can minimize exhaustion of atmospheric pollutants, and can utilize various fuels, such as a coal gas, a commercial city gas, and the like, by a hydrogen purifying function achieved by internal reforming. For the reasons described above, research and development of the solid electrolyte fuel cell are proceeding in Japan as well as overseas, in great expectation that it will be developed into a fuel cell operating at high temperature, following the phosphoric acid fuel cell (PAFC) and the molten carbonate fuel cell (MCFC).

The solid electrolyte fuel cell is broadly classified into a flat type and a tubular type. The tubular type is said to be advantageous in that it is excellent in strength and can separate gas relatively easily. Further, the tubular type requires solving fewer technical problems, because a gas is sealed only at the ends, and thus the number of elements to be developed is small. The tubular type is further classified into a longitudinal stripe type (Westinghouse type: a high current type having a structure in which unit cells are connected externally) and a lateral stripe type (a series connection type: a high voltage type having a structure in which unit cells are connected internally) (for example, refer to "Power Generation with a Fuel Cell", edited by Specialized Committee for Researching Fuel Cell Operability of The Institute of Electrical Engineers of Japan, issued by Corona (1994), pages 76-80). Of these two types, the present invention relates to the lateral stripe type. Since the lateral stripe type employs internal connection, once unit cells are produced, they are advantageous in operation stability as stacked cells.

FIG. 24 is a front elevation view showing a conventional solid electrolyte fuel cell of the lateral stripe tubular type with its upper half portion in cross section. As shown in FIG. 24, a gas-tight portion (non-power-generating portion) and a permeability portion (power-generating portion) are formed by forming a dense ceramic membrane 51 around the circumference of a porous ceramic base tube 50. A fuel cell stack is completed thereafter by sequentially forming a fuel electrode 52, a solid electrolyte membrane 53, an inter-connector 54, a current taking-out terminal lead 55, a dense ceramic membrane 56, and an air electrode 57. The process for producing a lateral stripe tubular SOFC 60 is completed by attaching current taking-out lead wires 58 and gas supply/exhaust ceramic end caps 59 to both sides of the fuel cell stack. As described above, a lateral stripe tubular SOFC has such an arrangement that unit cells, each of which has a three-layer-laminated structure comprised of a fuel electrode, a solid electrolyte, and an air electrode formed on a base tube, are connected in series to each other through an inter-connector, although the materials thereof are somewhat different.

Operation of the solid electrolyte fuel cell will be briefly explained here. Basically, the solid electrolyte fuel cell has a structure in which a solid electrolyte is sandwiched between electrode plates having good gas permeability. Yttria-stabilized zirconia (YSZ), which has a composition of, for example, $(Y_2O_3)_{0.08}(ZrO_2)_{0.92}$, as a composite oxide that maintains a fluorite-type cubic crystalline structure from room temperature to a high temperature, and which is chemically stable, is used as the solid electrolyte. Since the yttria-stabilized zirconia is composed of quadrivalent zirconium oxide, in which tervalent yttrium oxide is solid-solubilized, an oxide ion vacancy is formed in a crystal, and the vacancy moves freely in the crystal at a high temperature. When gas-permeable electrodes are attached to both sides of the YSZ, and an oxygen density difference is applied to both sides thereof, oxygen moves into the YSZ, as $O^{2-}$ ions from the high density side (the cathode, which is generally referred to as an air electrode), and it is moved to the low-oxygen side (the anode, which is generally referred to as a fuel electrode) by the density difference, to thereby carry electrons. The $O^{2-}$ ions, having reached the anode, react with the fuel and discharge electrons, and the discharged electrons flow in an external circuit, and work on a load.

The advantage of the solid electrolyte fuel cell (SOFC) can be utilized at the maximum by operating it at a high temperature (for example, 800 to 1000° C.). Accordingly, how thermal stress is suppressed to a low level is a significant problem, from which it is said to be preferable for all of the components of the SOFC to be comprised of a combination of materials whose thermal expansion coefficients are in conformity with each other. Thus, an oxide electrically conductive material, such as a lanthanum-chromite oxide ($LaCrO_3$, which contains Mg, Ca, and Ti to adjust a thermal expansion coefficient, is often used), is used as a material of the inter-connector of the SOFC (refer to, for example, JP-A-52-21743 and JP-A-2002-145658). In the longitudinal stripe type (Westinghouse type: high current type), the $LaCrO_3$ material has no particular problem, because an electrically conductive passage is short in an inter-connector portion (the structure of this type is essentially devised to shorten the electrically conductive passage). However, since the lateral stripe type (series connection type: high voltage type) has a long electrically conductive passage in its structure, a problem arises in that the internal resistance of a cell is greatly increased when an oxide material having poor electric conductivity is used. To cope with this problem, it is proposed to compose the inter-connector of cermet; that is, an alloy material having higher electric conductivity, such as NiAl, NiCr or the like (refer to, for example, JP-A-8-162139 and JP-A-8-222246).

The inter-connector is required to secure gas tightness and to have high electric conductivity. Although an electrically conductive material is also used in a fuel electrode and in an air electrode, they are relatively less affected by thermal stress, because they are composed of porous membranes. However, since the inter-connector must be formed of a dense membrane to secure gas tightness, a large amount of internal stress occurs in the inter-connector. In particular, in the lateral stripe tubular type, since the inter-connector has large thickness, when the alloy material is used, there is a large difference between the thermal expansion coefficient of the inter-connector and that of a solid electrolyte, even if the alloy material is made to cermet, and thereby an inter-connector portion is liable to be deteriorated by repeating operation, and stop. That is, exfoliation and cracks are liable to occur in the inter-connector portion. In contrast, even if the inter-connector employs an alloy material as its material, since the alloy material is used as cermet, it is difficult to secure a high conversion efficiency, because the resistance value increases in the cell connecting portion.

Further, another problem of the conventional SOFC resides in that the gas permeability of electrodes is deteriorated while they are operated for a long period of time. Conventionally, when an electrode for an SOFC is formed, it is ordinarily composed of a porous thin membrane having a uniform thickness and formed on an entire electrolyte membrane (on both the front and back surfaces thereof). The membrane has a contradictory condition in that it must be provided with electric conductivity while also be formed as a porous membrane having good gas permeability. Accordingly, when the thickness of the membrane is excessively reduced or is excessively made porous to improve the gas permeability, the problem arises that the electrically conductive performance of the membrane is deteriorated, and the internal resistance of a cell is increased. In contrast, when the thickness of the membrane is increased to secure electric conductivity, gas passage is increased, and thus gas-permeable performance is deteriorated. Therefore, a compromise between both conditions must be made at some intermediate point.

Since the SOFC has a high operating temperature of 800 to 1000° C., and an electrode membrane is exposed to a high temperature for a long time, gas cavities become clogged, due to sintering and the like of the electrode membrane, as time passes, so that a phenomenon arises that the gas-permeable performance is deteriorated. Accordingly, power generation performance is deteriorated, because fuel gas is not supplied well on the fuel electrode side, and oxidizing agent gas is not supplied well on the air electrode side. As a result of measurement, deteriorating characteristics, in which the output of generated power is gradually reduced, often arise. It cannot be said that all causes of this phenomenon are attributable to the above problems, but it is a fact that the problems considerably relate to the causes of the phenomenon. This phenomenon sometimes arises in both the air electrode and the fuel electrode; it sometimes arises in only one of them, and it also arises in association with an electrode material. Accordingly, it is difficult to specify the cause of the phenomenon. Trouble arises in the supply of gas, because the gas-permeable performance is deteriorated due to sintering of the electrodes (air electrode and fuel electrode) for the SOFC.

Another problem of the conventional SOFC resides in that exfoliation and cracks occur in the air electrode and the fuel electrode when they are kept at a high temperature for a long time, because they are composed of a material different from that of the base tube and the solid electrolyte, and thus the thermal expansion coefficient of the electrodes is different from that of the base tube and the solid electrolyte. In addition to the above problem, the possibility that the air and fuel electrodes may be exfoliated is increased, because they have an inferior intimate contact property with the base tube and the solid electrolyte.

SUMMARY OF THE INVENTION

The present invention resides in a tubular fuel cell in which each of cells comprises a first porous inter-connector membrane, a first electrode, a solid electrolyte membrane, a second electrode, and a second porous inter-connector membrane laminated in this order from a lower layer, wherein the first porous inter-connector membrane and the second porous inter-connector membrane between adjacent cells are connected to each other through an intermediate inter-connector membrane, and wherein the intermediate inter-connector membrane includes at least one layer comprised of a dense electrically conductive membrane.

Further, the present invention resides in a tubular fuel cell, in which a first electrode, a solid electrolyte membrane, and a second electrode are laminated on a porous tubular base tube, and wherein the first electrode and/or the second electrode is formed of two layers including an active layer membrane contributing to a chemical reaction and a collector membrane mainly having a function for taking out a current.

Other and further features and advantages of the invention will appear more fully from the following description, taken in connection with the accompanying drawings.

BRIEF DESCRIPTION OF THE DRAWINGS

FIG. 2(a) is the perspective view showing a state in which membranes up to a solid electrolyte membrane 5 are formed on a base tube. FIG. 2(b) is the perspective view showing a state in which the membranes up to the solid electrolyte membrane 5 are formed on the base tube. FIG. 2(c) is the perspective view showing a state in which the membranes up to the solid electrolyte membrane 5 are formed on the base tube. FIG. 2(d) is the perspective view of a C-shaped dense metal foil 4A for an IC. FIG. 2(e) is the sectional view of the tubular fuel cell in a portion corresponding to the line B-B of FIGS. 2(b) and 2(c). FIG. 2(f) is the sectional view of the tubular fuel cell on the line A-A of FIGS. 2(b) and 2(c).

FIG. 3(a) is the perspective view showing a state of a cell portion after an exfoliation preventing membrane 8 is formed on a porous metal IC membrane 7 in a ring shape. FIG. 3(b) is the perspective view showing a state of the cell portion after the exfoliation preventing membrane 8 is formed to entirely cover the solid electrolyte membrane and the porous metal IC membrane. FIG. 3(c) is the perspective view showing a state of the cell portion after the exfoliation preventing membranes 8 having ring-shaped slits are formed on the porous metal IC membrane 7. FIG. 3(d) is the perspective view showing a state of the cell portion after the exfoliation preventing membrane 8 is formed on the porous metal IC membrane 7 to provide circular holes at appropriate positions.

FIG. 5(a) is the sectional view showing a state of the cell connecting portion. FIG. 5(b) is the sectional view showing a state of the cell connecting portion.

FIG. 6(a) is the perspective view showing a state when a process for forming a ring-shaped auxiliary restraint membrane 9 is completed. FIG. 6(b) is the perspective view showing a state when a process for forming the auxiliary restraint membrane 9 with circular windows is completed. FIG. 6(c) is the perspective view showing a state when a process for forming the auxiliary restraint membrane 9 with strip-shaped windows is completed.

FIG. 7(a) is the sectional view showing a main portion of an electrode structure of the present invention. FIG. 7(b) is the sectional view of an electrode including the portions shown in FIG. 7(a). FIG. 7(c) is the sectional view showing a main portion of a conventional electrode structure.

FIG. 8(a) is the sectional view of a mode in which anode active layer membranes 102a are formed in a strip shape. FIG. 8(b) is the sectional view of a mode in which the anode active layer membranes 102a are formed on the anode collector membranes 102c to overlap it. FIG. 8(c) is the sectional view of a mode in which the anode collector membranes 102c and the anode active layer membranes 102a are alternately formed. FIG. 8(d) is the sectional view of a mode in which the anode active layer membranes 102a are formed in the strip shape on both the sides of each of the anode collector membrane 102c formed in the strip shape. FIG. 8(e) is the sectional view showing a mode in which only the anode active layer membranes 102a are formed in the strip shape.

FIG. 9(a) is the sectional view showing a mode in which cathode collector membranes 104c are formed in a thin strip shape at intervals. FIG. 9(b) is the sectional view showing a mode in which cathode active layer membranes 104a are formed in the strip shape and cathode collector membranes 104c are formed thereon to cover them. FIG. 9(c) is the sectional view showing a mode in which the cathode active layer membranes 104a are formed in the strip shape and the cathode collector membranes 104c are formed thereon to overlap parts thereof in the strip shape likewise. FIG. 9(d) is the sectional view showing a mode in which the cathode collector membranes 104c are formed to bury the spaces between the cathode active layer membranes 104a formed in the strip shape. FIG. 9(e) is the sectional view showing a mode in which the cathode collector membranes 104c are formed to bury the spaces between the cathode active layer membranes 104a formed in a two-strip shape. FIG. 9(f) is the sectional view showing a single layer membrane structure of the cathode active layer membrane 104a without forming the collector membranes.

FIGS. 10(a) to 10(d) are perspective views showing various modes of an electrode membrane of the present invention. FIG. 10(a) is the perspective view showing a mode in which an anode collector membrane 102c has strip-shaped portions and annular portions formed to both the ends of the strip-shaped portions. FIG. 10(b) is the perspective view showing a mode in which the anode collector membrane 102c has wave-shaped portions and annular portions formed to both the ends of the wave-shaped portions. FIG. 10(c) is the perspective view showing a mode in which the anode collector membrane 102c has wave-shaped portions and wave-shaped annular portions formed to both the ends of the wave-shaped portions. FIG. 10(d) is the perspective view showing a mode in which the anode collector membrane 102c has strip-shaped portions and annular portions formed to both the ends and the central portion of the strip-shaped portions.

FIG. 11(a) is the perspective view showing a mode in which the coil-shaped anode collector membrane 102c is formed around a base tube 101. FIG. 11(b) is the perspective view showing a mode in which each of the anode active layer membranes 102a and each of the anode collector membranes 102c are formed in the coil shape so as to be in contact with each other. FIG. 11(c) is the perspective view showing a mode in which respective two of the anode collector membranes 102c formed in the coil shape are formed to intersect with each other.

FIGS. 12(a) and 12(b) are plan view and a perspective view explaining a membrane forming method in the tubular fuel cell according to the present invention. FIG. 12(a) is the plan view showing a masking plate 110 having holes 111 defined at appropriate positions. FIG. 12(b) is the perspective view showing a tube member around which masking bars 112 coupled with each other through coupling strings 113 are disposed.

FIG. 17(a) is a sectional view of a tubular fuel cell of an example 3. FIG. 17(b) is a sectional view of a tubular fuel cell of an example 3.

FIG. 19(a) is a sectional view of a tubular fuel cell of an example 5. FIG. 19(b) is a sectional view of a tubular fuel cell of an example 5.

FIG. 20(a) is a sectional view of a tubular fuel cell of an example 6. FIG. 20(b) is a sectional view of a tubular fuel cell of an example 6.

FIG. 21(a) is the sectional view of the tubular fuel cell at one step of a production process. FIG. 21(b) is the perspective view of the tubular fuel cell at the one step of the production process.

FIGS. 22(a) and 22(b) are a sectional view and a perspective view explaining a method of producing the tubular fuel cell of an example 8. FIG. 22(a) is the sectional view of the tubular fuel cell at one step of a production process. FIG. 22(b) is the perspective view of the tubular fuel cell at the one step of the production process.

DETAILED DESCRIPTION OF THE INVENTION

Figure 1:
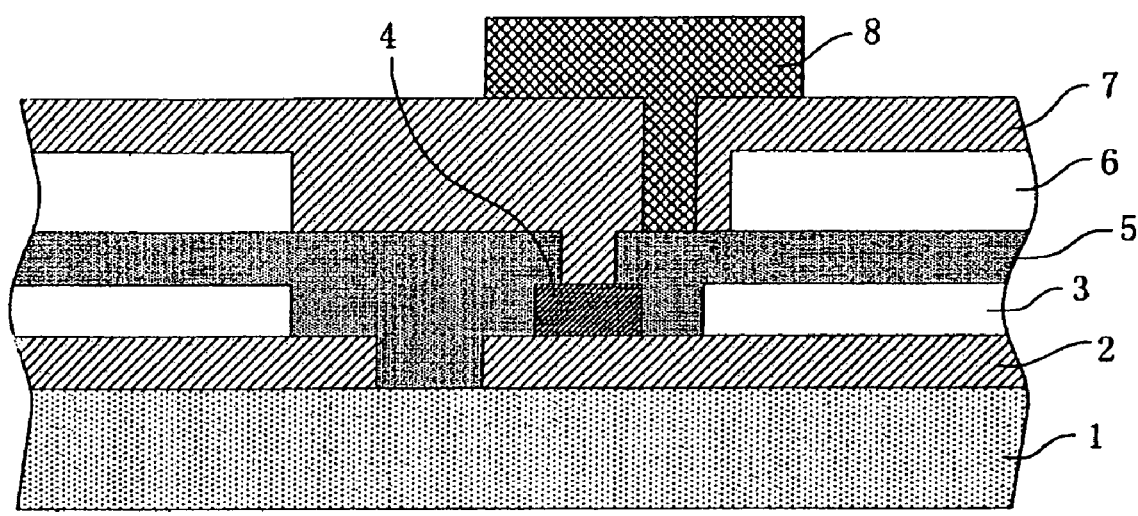
FIG. 1 is a sectional view schematically showing a structure of a cell connecting portion in an embodiment of a tubular fuel cell of the present invention.

According to the present invention, there are provided the following means:

(1) A tubular fuel cell in which each of cells comprises a first porous inter-connector membrane, a first electrode, a solid electrolyte membrane, a second electrode, and a second porous inter-connector membrane laminated in this order from a lower layer, wherein the first porous inter-connector membrane and the second porous inter-connector membrane between adjacent cells are connected to each other through an intermediate inter-connector membrane that comprises at least one layer composed of a dense (packed) electrically conductive membrane.

(2) The tubular fuel cell according to item (1), wherein the intermediate inter-connector membrane comprises a single dense electrically conductive membrane or a porous electrically conductive membrane and an upper layer dense electrically conductive membrane and a lower layer dense electrically conductive membrane between which the porous electrically conductive membrane is sandwiched.

(3) The tubular fuel cell according to item (1) or (2), wherein the first and second porous inter-connector membranes are formed of a material mainly comprising a high heat/oxidation resistant alloy whose heat and oxidation resistances are higher than that of Fe.

(4) The tubular fuel cell according to item (1) or (2), wherein the first and second porous inter-connector membranes are formed of a material mainly comprising NiCrAlY, SUS (stainless steel), inconel or incoloy.

(5) The tubular fuel cell according to any one of items (1) to (4), wherein an oxide is added to the first and second porous inter-connector membranes.

(6) The tubular fuel cell according to item (5), wherein the oxide is a material selected from alumina, zirconia, $LaCrO_3$ and YSZ.

(7) The tubular fuel cell according to any one of items (1) to (6), wherein the intermediate inter-connector membrane is formed of any of an electrically conductive oxide, NiCrAlY, SUS (stainless steel), inconel or incoloy.

(8) The tubular fuel cell according to item (7), wherein the electrically conductive oxide is a material mainly comprising $LaCrO_3$.

(9) The tubular fuel cell according to item (8), wherein Mg and/or Ca is added to the electrically conductive oxide.

(10) The tubular fuel cell according to any one of items (2) to (9), wherein the single dense electrically conductive membrane has a thickness of 20 μm to 300 μm, and the upper and lower layer dense electrically conductive membranes have a thickness of 10 μm to 150 μm.

(11) The tubular fuel cell according to any one of items (1) to (10), wherein the solid electrolyte membrane covers the dense electrically conductive membrane, the single dense electrically conductive membrane, or the upper layer dense electrically conductive membrane so as to expose the connecting portion thereof to the second porous inter-connector membrane.

(12) The tubular fuel cell according to any one of items (1) to (11), wherein an auxiliary restraint membrane, which comprises a material having a thermal expansion coefficient smaller than that of the first and second porous inter-connector membranes, annularly covers the solid electrolyte membrane while exposing the connecting portion of the dense electrically conductive membrane, the single dense electrically conductive membrane, or the upper layer dense electrically conductive membrane which portion is connected to the second porous inter-connector membrane.

(13) The tubular fuel cell according to item (12), wherein the auxiliary restraint membrane is a porous alumina membrane.

(14) The tubular fuel cell according to any one of items (1) to (13), wherein an exfoliation preventing membrane composed of a material having a thermal expansion coefficient smaller than that of the first and second porous inter-connector membranes is formed on the second porous inter-connector membrane to cover at least the intermediate inter-connector membrane.

(15) The tubular fuel cell according to item (14), wherein the exfoliation preventing membrane is entirely formed to cover all the cells.

(16) The tubular fuel cell according to item (15), wherein the exfoliation preventing membrane has openings formed at appropriate positions.

(17) The tubular fuel cell according to any one of items (14) to (16), wherein the exfoliation preventing membrane is a porous membrane at least on the regions where power is generated.

(18) The tubular fuel cell according to any one of items (14) to (17), wherein the exfoliation preventing membrane is formed of alumina.

(19) The tubular fuel cell according to any one of items (1) to (18), wherein the cells are formed on a ceramic base tube or on an alloy base tube comprising a heat resistant alloy tube covered with a ceramic membrane.

(20) The tubular fuel cell according to item (19), wherein the ceramic base tube is formed of alumina or calcia stabilized zirconia (CSZ).

(21) The tubular fuel cell according to item (19), wherein the heat resistant alloy tube is formed of any one of NiCrAlY, SUS (stainless steel), inconel, and incoloy.

(Hereinafter, the tubular fuel cells according to the items (1) to (21) above are referred to as a first embodiment of the present invention.)

(22) A tubular fuel cell, in which a first electrode, a solid electrolyte membrane, and a second electrode are laminated on a porous tubular base tube, and wherein the first electrode and/or the second electrode is formed of two layers comprising an active layer membrane contributing to a chemical reaction and a collector membrane mainly having a function for taking out a current.

(23) The tubular fuel cell according to item (22), wherein a laminated member comprising the first electrode, the solid electrolyte membrane, and the second electrode is arranged as a unit cell, and the unit cells are connected to each other in the lengthwise direction of the base tube in a multi-stage through an inter-connector.

(24) The tubular fuel cell according to item (22) or (23), wherein the first electrode is formed using a NiO or Ni material as the material of an active layer membrane and using NiCrAlY as the material of a collector membrane.

(25) The tubular fuel cell according to any one of item (22) to (24), wherein the second electrode is formed using a $LaMnO_3$ or $LaCoO_3$ material as the material of the active layer membrane and using NiCrAlY as the material of the collector membrane.

(26) The tubular fuel cell according to any one of items (22) to (25), wherein the active layer membrane of the first electrode is formed on the collector membrane of the first electrode as the coated membrane of the fine powder of the active layer membrane material.

(27) The tubular fuel cell according to any one of items (22) to (26), wherein the active layer membrane of the first or second electrode is formed to entirely cover a circumference, or formed in a net shape, in a coil shape, in a strip shape, or in a shape in which a strip-shaped electrically conductive layer is combined with an annular electrically conductive layer.

(28) The tubular fuel cell according to any one of items (22) to (27), wherein the collector membrane of the first or second electrode is formed to entirely cover a circumference, or formed in a net shape, in a coil shape, in a strip shape, or in a shape in which a strip-shaped electrically conductive layer is combined with a annular electrically conductive layer.

(29) The tubular fuel cell according to any one of items (22) to (28), wherein the first electrode in the same cell is formed on the base tube to partly expose the base tube, and the exposed portion is covered with the solid electrolyte membrane.

(30) The tubular fuel cell according to any one of items (22) to (29), wherein a restraint membrane comprising a ceramic material is formed to cover the second electrode.

(31) The tubular fuel cell according to item (30), wherein the restraint membrane is formed by combining a porous membrane and a dense membrane.

(32) The tubular fuel cell according to item (30) or (31), wherein the second electrode in the same cell is formed on the solid electrolyte membrane to partly expose it, and the exposed portion is covered with the restraint membrane.

(33) A method of producing a tubular fuel cell according to any one of items (22) to (32), wherein any one layer or a plurality of layers of the active layer membrane and the collector membrane of the first electrode and the active layer membrane and the collector membrane of the second electrode are formed by a laser spray method.

(34) The method of producing a tubular fuel cell according to item (33), wherein a heat treatment is performed in an oxidizing atmosphere after the collector membrane of the first or second electrode is formed.

(35) A method of producing a tubular fuel cell, wherein a treatment is performed in a solution containing Y before the heat treatment according to item (34) is performed.

(Hereinafter, the tubular fuel cells and the methods of producing the tubular fuel cell according to the items (22) to (35) above are referred to as a second embodiment of the present invention.)

Herein, the present invention means to include both of the above first and second embodiments, unless otherwise specified.

Some specific examples of the tubular fuel cell and the method of producing said tubular fuel cell used in the present invention will be shown below, but the present invention is by no means limited thereto.

The present invention will be explained with reference to the drawings. First, the first embodiment of the present invention will be explained.

FIG. 1 is a sectional view schematically showing a structure of a cell connecting portion in the embodiment of the tubular fuel cell of the present invention. As shown in FIG. 1, a porous metal IC (inter-connector) membrane 2 is formed on a base tube 1, and a fuel electrode 3 and a dense (packed) metal IC membrane 4 are formed thereon. Then, a solid electrolyte membrane 5 is formed on the fuel electrode 3 and the dense metal IC membrane 4 so as to entirely cover the fuel electrode 3 as well as to cover the periphery of the dense metal IC membrane 4. An air electrode 6 is formed on the solid electrolyte membrane 5, and a porous metal IC membrane 7 is formed on the air electrode 6 so as to cover the air electrode 6 as well as to cover the exposed portion of the dense metal IC membrane 4. Further, an exfoliation preventing membrane 8 is formed in the disconnecting portion of the porous metal IC membrane 7 so as to cover the dense metal IC membrane 4.

A ceramic base tube can be used as the base tube 1. That is, a calcia stabilized zirconia (CSZ) tube and an alumina tube can be used. Otherwise, a metal-membrane-based tube proposed by the inventors in Japanese Patent Application No. 2003-303830 may be used. This is formed by forming an alloy membrane by spraying NiCrAlY, and the like on, for example, a tentative tubular Al base, forming a ceramic membrane on the alloy membrane by spraying alumina, and the like thereon, and removing the tentative Al base by etching. When the tubular fuel cell is operated at a high temperature of about 800° C. or more, the alloy membrane is preferably formed of NiCrAlY. However, recently, the SOFC tends to operate at a lower temperature, and when it is aimed to generate power at a low temperature on the order of 600° C. to 800° C., the alloy base tube can be formed using Ni—Cr alloy such as SUS (stainless steel), inconel, incoloy or the like.

The porous metal IC membrane 2 can be formed by spraying NiCrAlY by, for example, a flame spray method. The fuel electrode 3 can be formed by spraying, for example, NiO by, for example, a plasma spray method. The dense metal IC membrane 4 can be formed by spraying NiCrAlY by, for example, the flame spray method. The solid electrolyte membrane 5 can be formed by spraying YSZ by, for example, the plasma spray method. The air electrode 6 can be formed by spraying, for example, LaMnO$_3$ by, for example, the flame spray method. An oxide such as YSZ, ZrO$_2$, Al$_2$O$_3$ or the like may be added to LaMnO$_3$. A metal such as Mg, Ca, Sr or the like may be added to LaMnO$_3$ in addition to the oxide or without containing it.

The porous metal IC membrane 7 can be formed by spraying NiCrAlY by, for example, the flame spray method. The exfoliation preventing membrane 8 can be formed by spraying alumina by, for example, the plasma spray method.

When the SOFC is operated at the high temperature of about 800° C. or more, the porous metal IC membranes 2 and 7 and the dense metal IC membrane 4 are preferably formed of NiCrAlY. However, when it is aimed to generate power at a temperature equal to or less than the above temperature, they may be formed using other Ni—Cr alloy such as SUS (stainless steel), inconel, incoloy or the like.

An Oxide such as alumina, YSZ, ZrO$_2$ or LaCrO$_3$ can be added to the porous metal IC membranes 2 and 7, thereby they can be easily made to porous when they are formed.

It is preferable to form the dense metal IC membrane 4 as thin as possible within the range in which gas tightness can be secured to suppress an inter-cell resistance to a low value. From this point of view, a thickness from 20 μm to 300 μm is selected. Two effects, that is, reduction of the inter-cell resistance value and reduction of internal stress can be achieved simultaneously by reducing the thickness of the dense metal IC membrane 4. Further, it is preferable to minimize the dimension of the dense metal IC membrane 4 within the range that is allowed by the inter-cell resistance. Miniaturization of the dense metal IC membrane 4 more reduces the internal stress, so that a possibility of occurrence of cracks and exfoliation is more reduced. Since the thickness of the intermediate IC membrane, which connects between the porous metal IC membranes 2 and 7, is reduced, it is possible to form a dense electrically conductive oxide IC membrane using LaCrO$_3$ and the like in place of the dense metal IC membrane 4. As described above, an increase of the thermal stress can be suppressed while suppressing an increase of the inter-cell resistance by using a material whose thermal expansion coefficient is near to that of a solid electrolyte to the intermediate IC membrane.

Figure 2A:
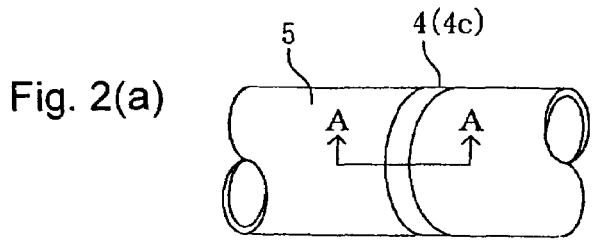
FIGS. 2(a) to 2(f) are perspective views and sectional views explaining the tubular fuel cell shown in FIG. 1.
Figure 2B:
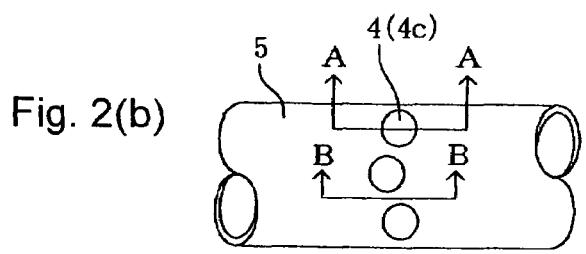
Figure 2C:
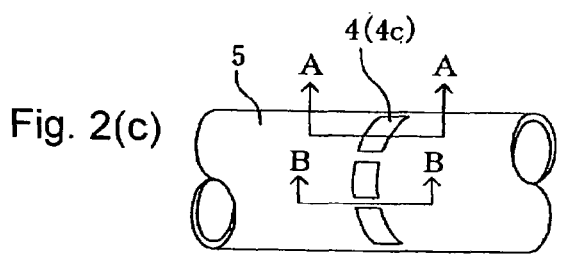

FIGS. 2(a), 2(b), and 2(c) are perspective views showing a state in which membranes up to the solid electrolyte membrane 5 are formed on the base tube. FIG. 1 corresponds to a sectional view at a position taken along the line A-A of FIG. 2(a). As shown in FIG. 2(a), the dense metal IC membrane 4 is formed in a ring shape around a periphery, and both the side ends of the dense metal IC membrane 4 are covered with the solid electrolyte membrane 5. That is, both the side ends of the dense metal IC membrane 4 are pressed by the solid electrolyte membrane 5.

The dense metal IC membrane 4 may be formed in a circular shape or in a strip shape as shown in FIGS. 2(b) and 2(c), instead of forming the dense metal IC membrane 4 continuously on a circumference, and the peripheral portion thereof may be covered with the solid electrolyte membrane 5. FIG. 2(e) shows a sectional view, which is taken along the line B-B of FIGS. 2(b) and 2(c), of the dense metal IC membrane 4 and the solid electrolyte membrane 5 when they are formed as described above. Note that the sectional views of the portions, which correspond to the line A-A of FIGS. 2(b) and 2(c), of the dense metal IC membrane 4 and the solid electrolyte membrane 5 are as shown in FIG. 1. The thermal stress can be suppressed to a very low level by discontinuously forming the dense metal IC membrane 4 in a small area. Otherwise, the dense metal IC membrane 4 may be formed in a ring shape (continuously), and circular or strip-shaped windows may be formed to the solid electrolyte membrane 5. FIG. 2(f) shows a sectional view, which is taken along the line B-B of FIGS. 2(b) and 2(c), of the dense metal IC membrane 4 and the solid electrolyte membrane 5 when they are formed as described above.

In the above explanation, the dense metal IC membrane 4 is directly formed on the porous metal IC membrane 2 by the spray method, and the like. However, in place of this method, a C-shaped dense metal IC foil 4A shown in FIG. 2(d) may be previously formed, and after the fuel electrode 3 is formed on the porous metal IC membrane 2, the dense metal IC foil 4A may be attached to the porous metal IC membrane 2 and may be pressed by a sprayed solid electrolyte membrane from thereabove.

As shown in FIGS. 3(a) to 3(d), the exfoliation preventing membranes 8 are formed on the dense metal IC membrane 4 so as to cover the dense metal IC membrane 4. The exfoliation preventing membranes 8 are formed of an insulating oxide such as a dense alumina membrane, and the thermal expansion coefficient thereof is smaller than that of the dense metal IC membrane 4. Accordingly, the dense metal IC membrane 4 is pressed by the exfoliation preventing membranes 8 from thereabove at a high temperature, thereby exfoliation of the dense metal IC membrane 4 can be prevented. The same effect can be obtained even if the exfoliation preventing membranes 8 are formed of a porous alumina membrane.

Figure 3A:
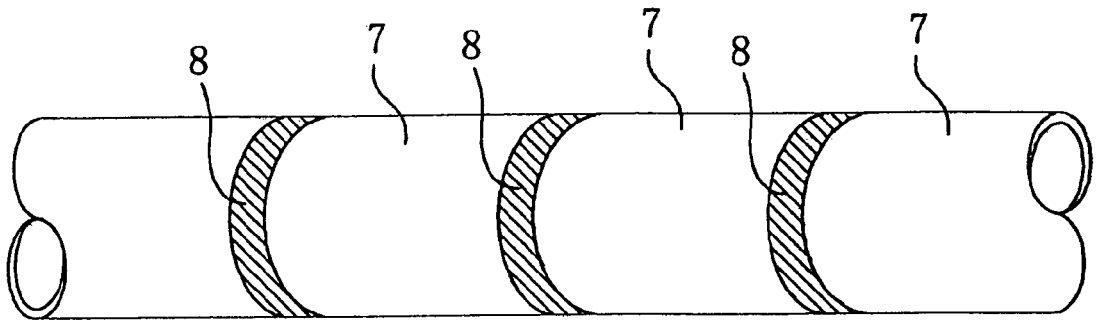
FIGS. 3(a) to 3(d) are perspective views explaining the tubular fuel cell shown in FIG. 1.

FIG. 3(a) is a perspective view showing a state of the cell portion after the exfoliation preventing membranes 8 are formed on the porous metal IC membrane 7. As shown in FIG. 3(a), the exfoliation preventing membranes 8 are formed in the ring shape.

Figure 3B:
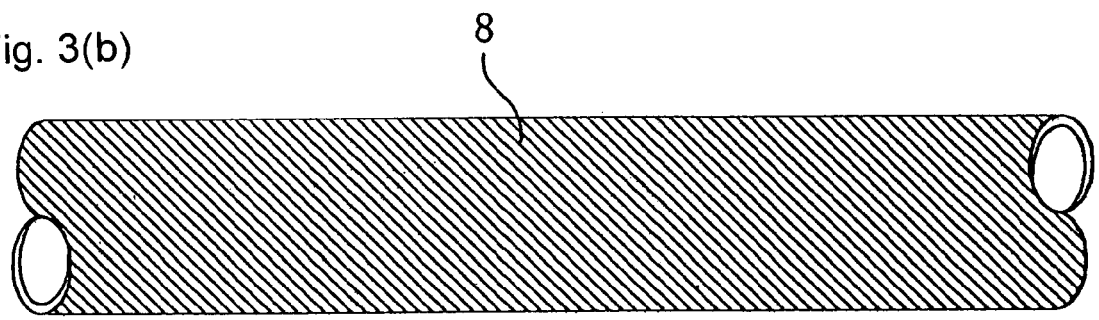
Figure 3C:
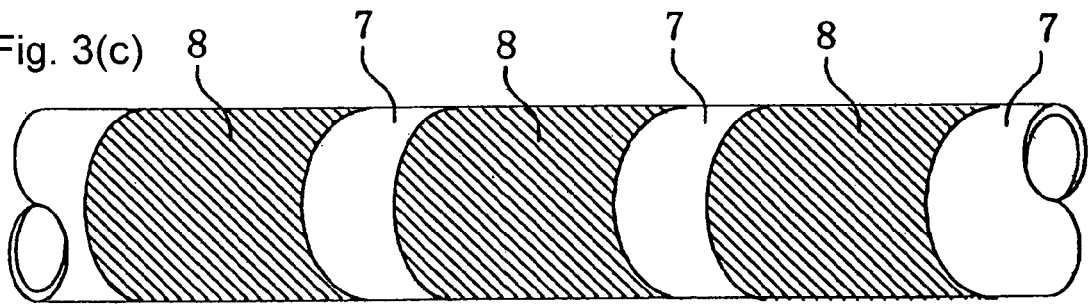
Figure 3D:
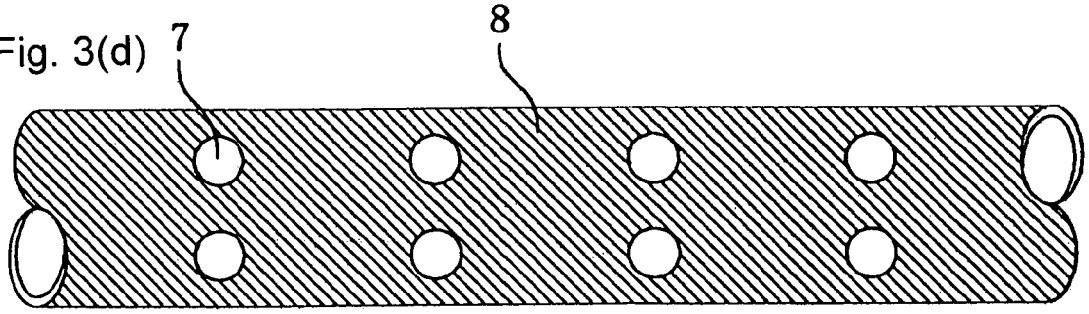

As shown in FIG. 3(b), the exfoliation preventing membrane 8 may be formed to entirely cover the solid electrolyte membrane 5 and the porous metal IC membrane 7. In this case, the exfoliation preventing membrane 8 is formed of a porous oxide membrane such as a porous alumina membrane. Otherwise, the exfoliation preventing membranes 8 having a ring-shaped slit may be formed as shown in FIG. 3(c). Further, as shown in FIG. 3(d), the exfoliation preventing membranes 8 may be provided with circular holes defined at arbitrary portions. When the exfoliation preventing membrane 8 is formed as shown in FIGS. 3(c) and 3(d), the exfoliation preventing membrane 8 is preferably formed of a porous membrane.

The exfoliation preventing membrane 8 is formed to cover at least the exposed portions of the connection portions of a different kind of membranes. It is preferable that the exfoliation preventing membranes 8 is composed of a porous membrane at least on power generating portions.

Figure 4:
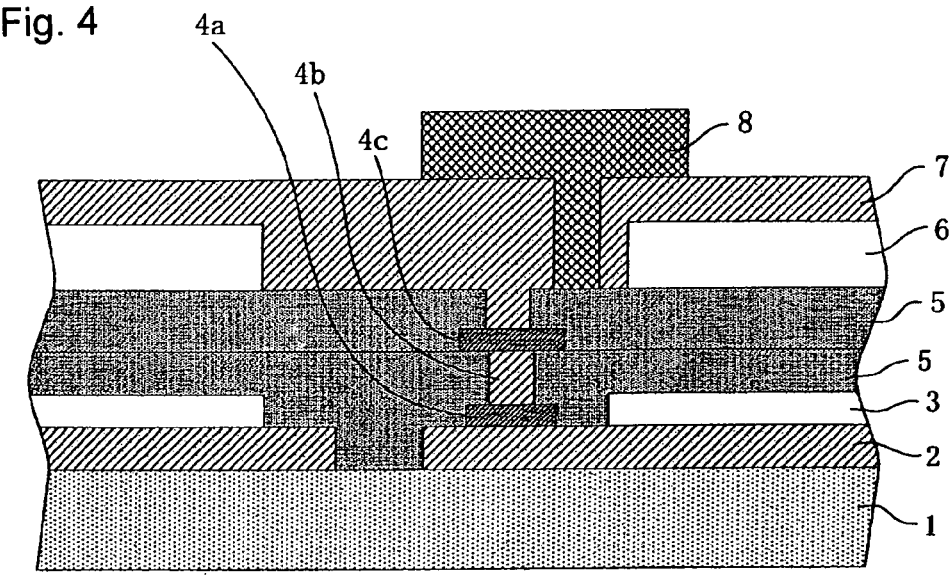
FIG. 4 is a sectional view showing a state of a cell connecting portion in another embodiment of the tubular fuel cell of the present invention.

FIG. 4 is a sectional view showing a state of the cell connecting portion in another embodiment of the present invention. In FIG. 4, the same portions as those shown in FIG. 1 are denoted by the same reference numerals, and the duplicated explanation thereof is appropriately omitted. In this embodiment, an intermediate IC membrane interposed between the porous metal IC membranes 2 and 7 is composed of a three-layer structure including a dense metal IC membrane 4a, an intermediate porous metal IC membrane 4b, and a dense metal IC membrane 4c. As described above, internal stress to be generated can be more suppressed by dividing the dense metal IC membrane into the two layers and inserting the intermediate porous metal IC membrane 4b acting as a buffer layer therebetween.

All the layers of the intermediate IC membranes of the three-layer structure may be formed of an electrically conductive oxide such as $LaCrO_3$ or the like. Otherwise, only upper two or one layer may be formed of the electrically conductive oxide. When the dense membrane of the lower layer is formed of NiCrAlY and the dense membrane of the upper layer is formed of $LaCrO_3$, the fuel electrode can be formed of a material having high resistance to reduction, and the air electrode can be formed of a material having high resistance to oxidation, so that an inter-connector having higher durability can be realized.

Figure 2D:
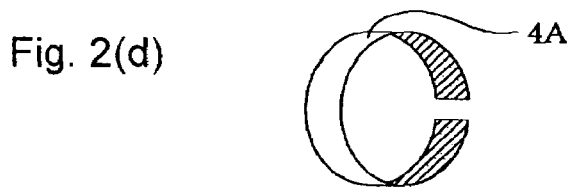
Figure 2E:
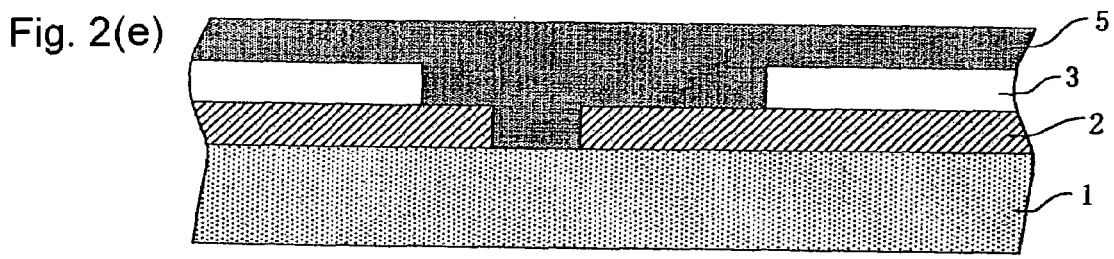
Figure 2F:
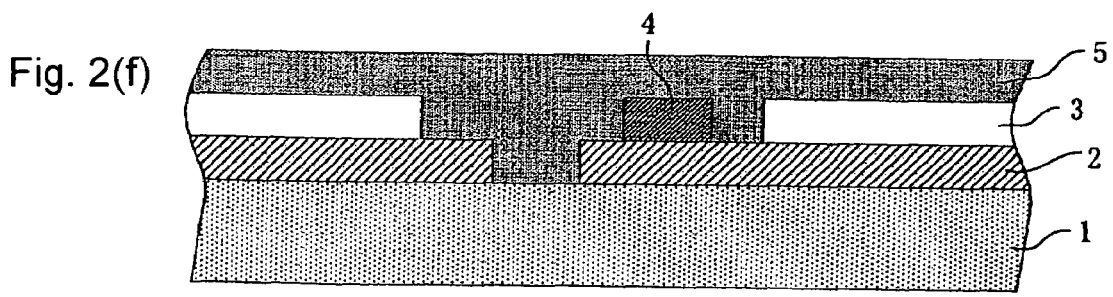

When the uppermost layer of the intermediate IC membrane is formed of a heat resistant alloy such as NiCrAlY, the upper layer may be formed of the dense metal IC foil 4A shown in FIG. 2(d).

It is preferable to form the dense metal IC membranes 4a and 4c as thin as possible within the range in which gas tightness can be secured to suppress an inter-cell resistance to a low value. From this point of view, the thickness of them is set to 10 μm or more and 200 μm or less. Further, the dimension (area) of the intermediate IC membrane (4a to 4c) is formed as smaller as possible within the range allowed by the inter-cell resistance.

Figure 5A:
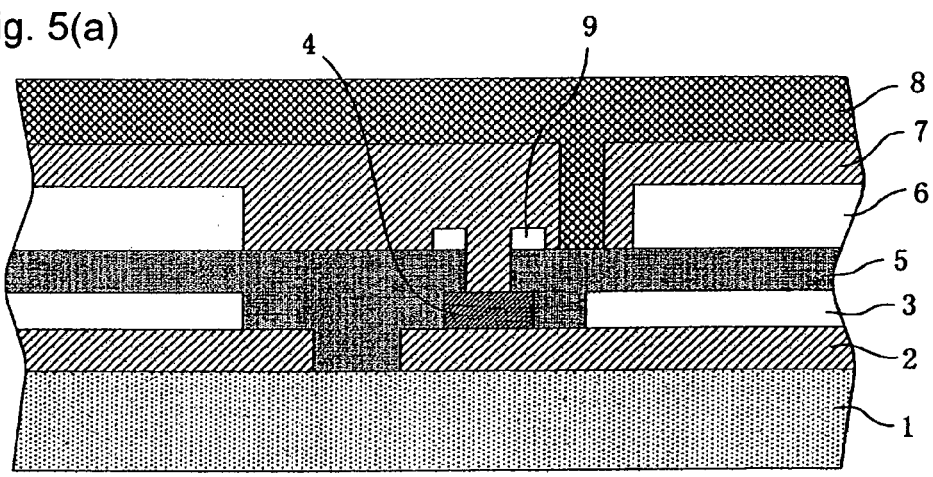
FIGS. 5(a) and 5(b) are sectional views of a main portion in still another embodiment of the tubular fuel cell of the present invention.
Figure 5B:
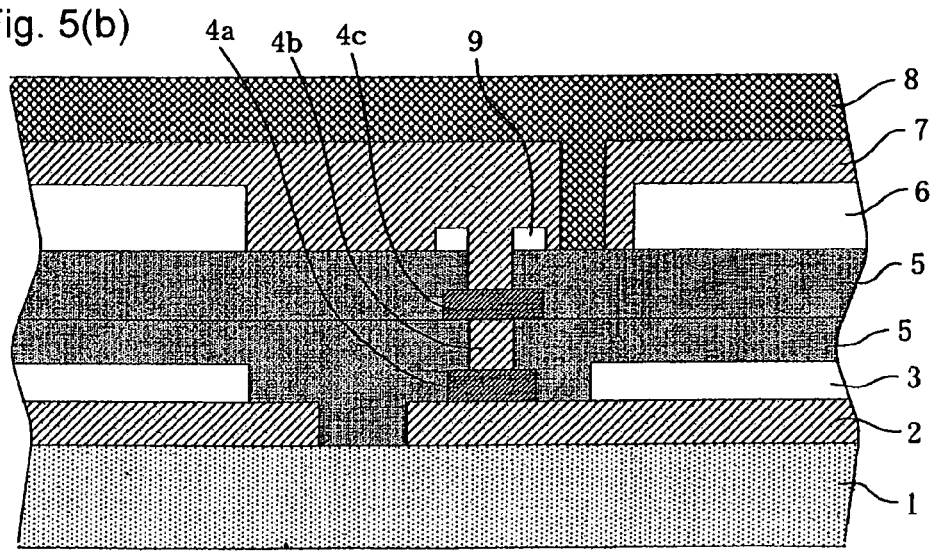

FIGS. 5(a) and 5(b) are sectional views showing a state of the cell connecting portion in still another embodiment of the present invention. In FIGS. 5(a) and 5(b), the same portions as those shown in FIGS. 1 and 4 are denoted by the same reference numerals, and the duplicated explanation thereof is appropriately omitted.

This embodiment is different from those shown in FIGS. 1 and 4 in that an auxiliary restraint membrane 9 is formed on the solid electrolyte membrane 5 to cover the peripheral portions of the intermediate IC membrane (4; 4a to 4c). The auxiliary restraint membrane 9 is formed of, for example, a porous alumina membrane, or a material whose thermal expansion coefficient is smaller than that of an alloy, such as an oxide. According to this structure, the intermediate IC membrane is pressed from thereabove also by the auxiliary restraint membrane 9, in addition to the solid electrolyte membrane 5. Accordingly, there can be realized an inter-connector structure which is not easily exfoliated even if a high and room temperature cycle is repeatedly applied by repeating an operation and a stop.

Figure 6A:
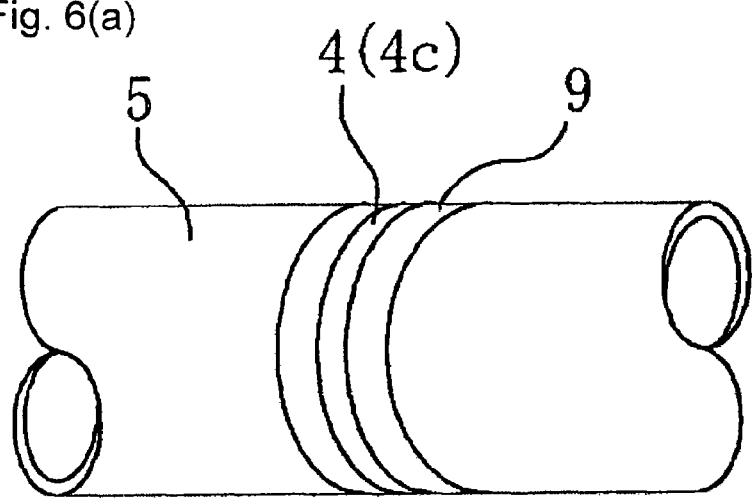
FIGS. 6(a) to 6(c) are perspective views explaining the tubular fuel cell shown in FIGS. 5(a) and 5(b).

FIG. 6(a) is a perspective view showing a state when a process for forming the auxiliary restraint membrane 9 is completed in a process for producing the SOFC of the embodiment. As shown in the figure, in the embodiment, the dense metal IC membrane 4 (4c) and the auxiliary restraint membrane 9 are formed in a ring shape.

Figure 6B:
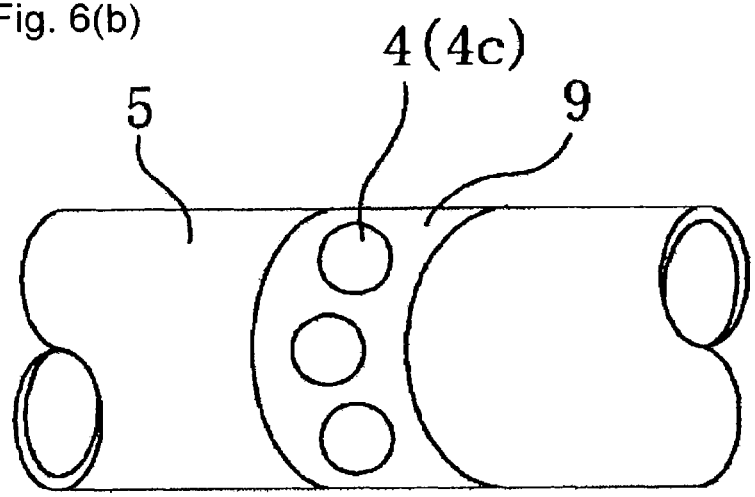
Figure 6C:
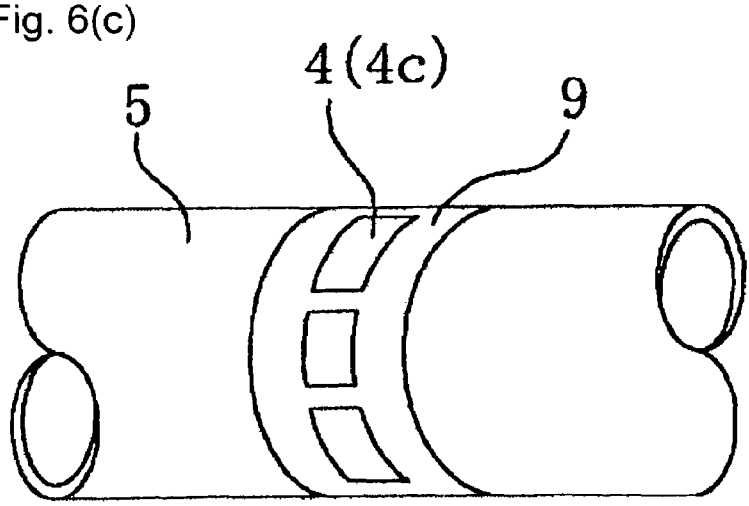

As shown in FIGS. 6(b) and 6(c), the auxiliary restraint membrane 9 may be formed as a single continuous membrane, and inter-connector connecting circular or strip-shaped windows may be defined at appropriate positions. When the auxiliary restraint membrane 9 is formed in the states shown in FIGS. 6(b) and 6(c), the dense metal IC membrane 4 (4c) may be continuously formed in a ring shape. However, it may be formed discontinuously in a circular shape or in a strip-shape.

Figure 7A:
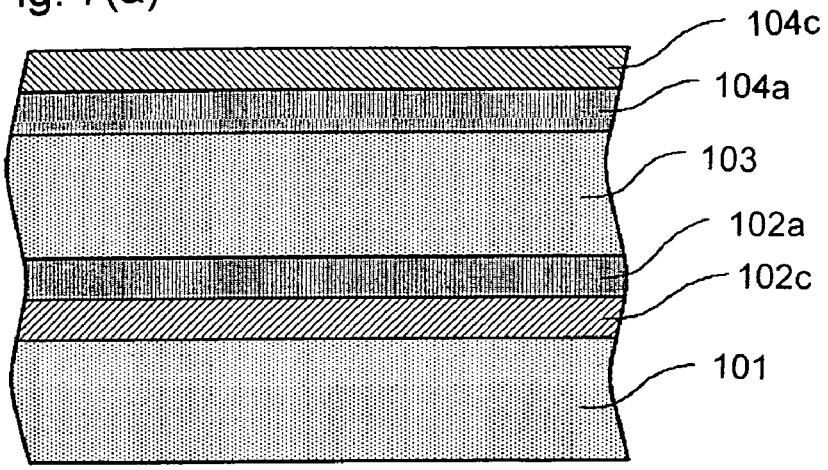
FIGS. 7(a) to 7(c) are sectional views showing a main portion of a fuel cell of an embodiment of the present invention and that of a fuel cell of a conventional example in comparison with each other.
Figure 7B:
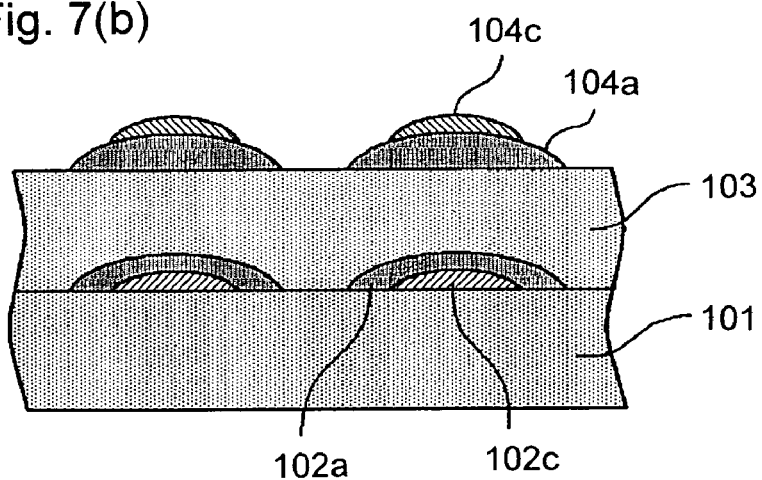
Figure 7C:
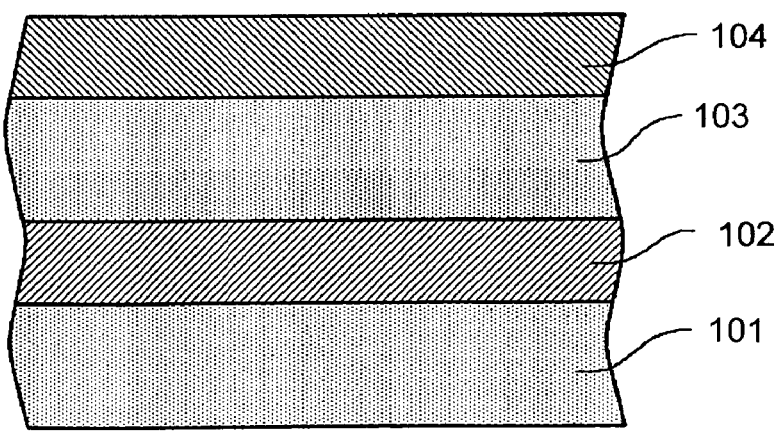

Next, the second embodiment of the present invention will be explained. FIGS. 7(a) and 7(b) show an example of an electrode structure according to the second embodiment, and FIG. 7(c) shows a conventional electrode structure for comparison. Conventionally, a cell is formed by laminating an anode (fuel electrode) 102, a solid electrolyte membrane 103, and a cathode (air electrode) 104 on a base tube 101 as shown in FIG. 7(c). In contrast, in the present invention, an anode is formed of an anode collector membrane 102c and an anode active layer membrane 102a, and a cathode is formed of a cathode active layer membrane 104a and a cathode collector membrane 104c as shown in FIG. 7(a). Further, the anodes (102c and 102a), which belong to the same cell, are not formed as continuous membranes and formed so as to expose the surface of the base tube 101 as shown in FIG. 7(b). Further, the cathodes (104a and 104c), which belong to the same cell, are not formed as continuous membranes and formed so as to expose the surface of the solid electrolyte membrane 103.

Incidentally, in the present invention, an electrode membrane (active layer membrane and collector membrane) may be formed as a continuous membrane making a round of a tube, but it may be formed in a divided shape without making a round of the tube. In the latter case, since the electrode membrane is not closed because it does not make a round of the tube, it has a weak bonding force to a base (base tube or electrolyte membrane). To cope with this problem, in the present invention, an electrolyte membrane or a restraint membrane, which is closed by making a round of an outer circumferential portion, is formed on the electrode membrane acting as an exfoliation preventing membrane for improving the durability of the electrode membrane. The electrolyte membrane or the restraint membrane comes into direct contact with the base (base tube or electrolyte membrane) in a void portion where no electrode membrane exists, and ceramics are joined to each other in the void portion, thereby easy occurrence of exfoliation can be prevented. Accordingly, the dividedly formed electrode membrane is reinforced by the electrolyte membrane or the restraint membrane formed thereon, so that the resistance to exfoliation of the electrode membrane is rather improved by the divided structure thereof.

Modes of the electrode membrane (active layer membrane and collector membrane) used as a dividedly formed anode or cathode will be explained below.

(Anode Side or Fuel Electrode Side)

Figure 8A:
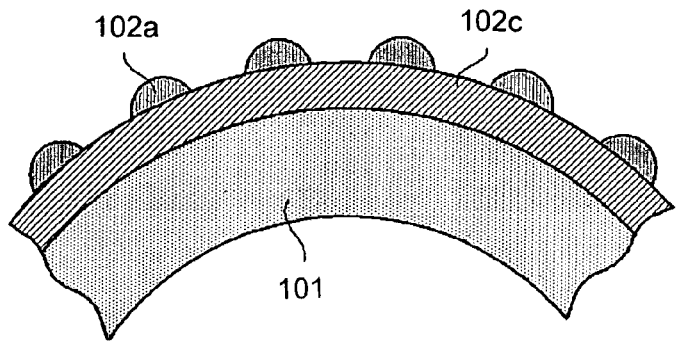
FIGS. 8(a) to 8(e) are sectional views showing various modes of an anode electrode membrane of the present invention.

FIGS. 8(a) to 8(e) are partial sectional views showing examples of the arrangement of the anode according to the present invention (drawings of the electrolyte membrane and the cathode are omitted). It is assumed here that a NiCrAlY material is used in the anode collector membrane 102c, and a Ni material is used in the anode active layer membrane 102a. In a usual lateral stripe tubular fuel cell, although an anode and a cathode are formed as continuous membranes that make a round on a circumference, the continuously formed membrane structure deteriorates the gas permeable performance when sintering of the entire membrane proceeds. Thus, as shown in FIG. 8(a), the anode active layer membrane 102a is formed in a stripe-shape (line-shape, in this example, the anode collector membrane 102c is formed as a continuous membrane). On the anode side, since Ni used as the material of the anode active layer is liable to be sintered inversely to the cathode side, it is important to form the anode active layer to a thin membrane by causing it to take charge of only a catalyst effect. In an ordinary cell, this membrane is also used as a current lead, the membrane must sufficiently secure electric conductivity. Accordingly, the membrane is required to have a certain degree of thickness, from which a problem of clogging occurs due to sintering. However, in a laminated type electrode structure, a collector membrane is formed separately and takes charge of part of an electrically conductive function. Accordingly, the thickness of the anode active layer can be greatly reduced to such a degree as to cause no problem of sintering. Further, the anode active layer membrane is arranged as the line-shaped membrane to improve a gas permeability. Since the collector membrane has a high electrically conductive property, it is formed as thick as a conventional anode membrane. The NiCrAlY alloy material of the collector membrane is used after it is made to an alloy membrane by being previously subjected to an oxidizing heat treatment after it is formed. Therefore, even if the membrane is somewhat thick, it is stable in a reducing atmosphere on the fuel electrode side in a temperature region when power is ordinarily generated, and thus the material does not deteriorate the gas permeable performance by losing a pore property.

Figure 8B:
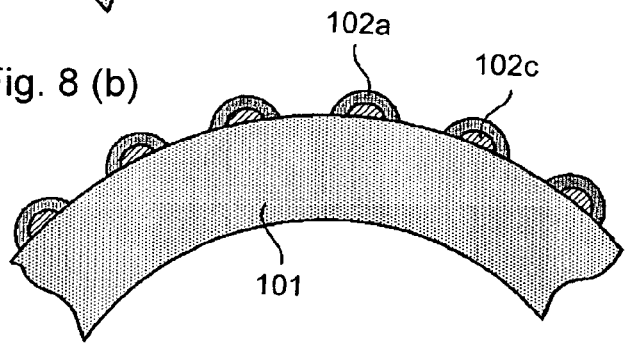
Figure 8C:
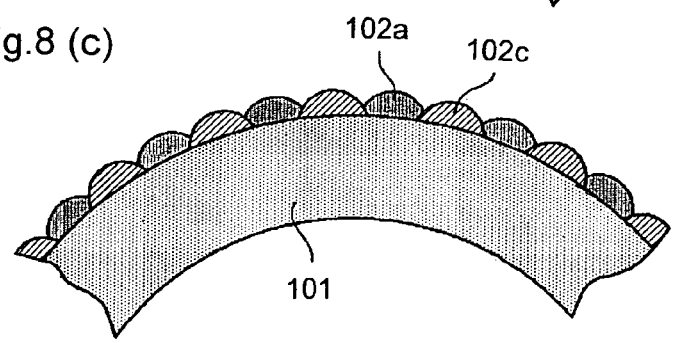
Figure 8D:
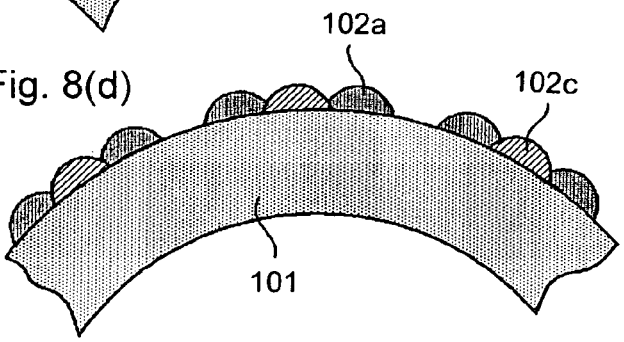

FIGS. 8(b) to 8(d) show examples in which the anode collector membranes 102c are also formed in the strip shape (line shape), in addition to the anode active layer membranes 102a. When the anode collector membranes 102c are formed as the strip-shaped membranes, effects can be expected in both the aspects of the gas permeability and saving of a material. FIG. 8(b) shows an example in which each of the anode active layer membranes 102a is formed on each of the anode collector membranes 102c to overlap it. In an example shown in FIG. 8(c), anode collector membranes 102c and anode active layer membranes 102a are formed alternately. Further, FIG. 8(d) shows an example in which anode active layer membranes 102a are formed in a strip shape on both the sides of each anode collector membrane 102c formed in a strip shape. In the examples shown in FIGS. 8(b) and 8(d), there exist regions in which no electrode is formed and the base tube is exposed in the regions. In the regions where the base tube is exposed, the base tube forms the joint of ceramic membranes to the electrolyte membrane acting as the restraint membrane, so that a structure having a high bonding strength and excellent in durability can be constructed.

On the anode side, since the electrolyte membrane is placed on the electrode and acts as the restraint membrane, it may be arranged as it is. However, when stress generated in an electrolyte material is too large to be suppressed, thinner belt-shaped alumina porous auxiliary restraint rings are appropriately disposed on the electrolyte membrane. However, the auxiliary restraint rings may be omitted because the restraint membrane is placed on the cathode when it is completed.

Figure 8E:
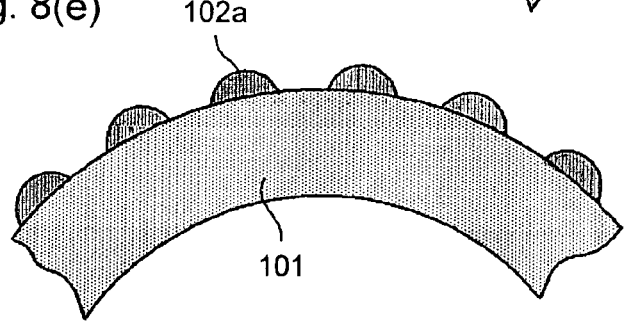
Figure 9A:
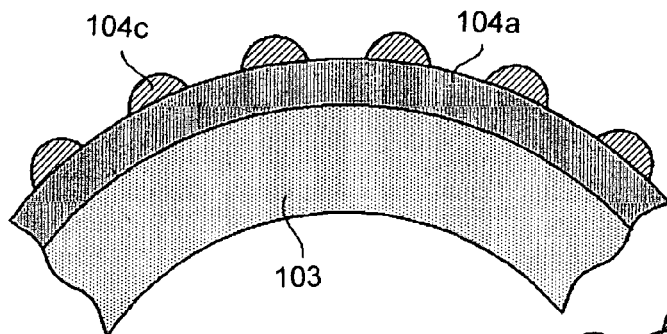
FIGS. 9(a) to 9(f) are sectional views showing various modes of a cathode electrode membrane of the present invention.
Figure 9B:
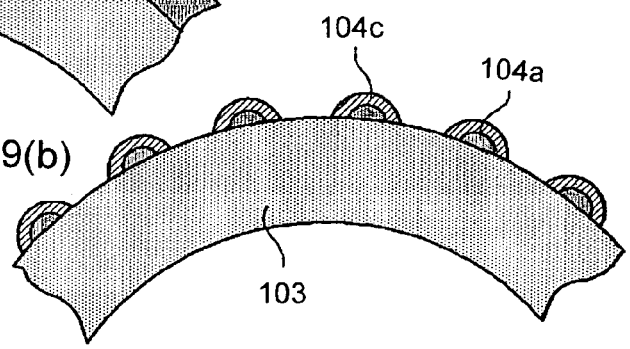
Figure 9C:
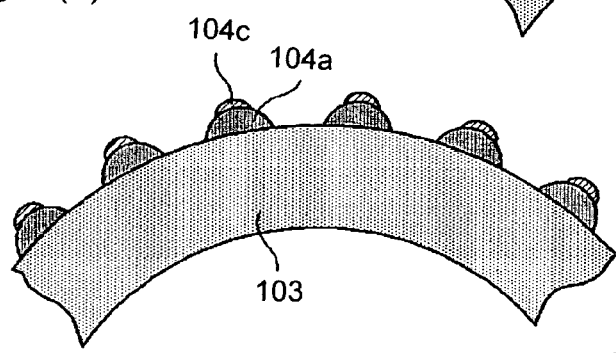
Figure 9D:
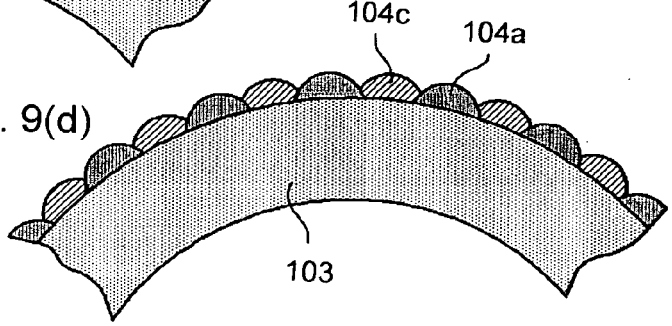
Figure 9E:
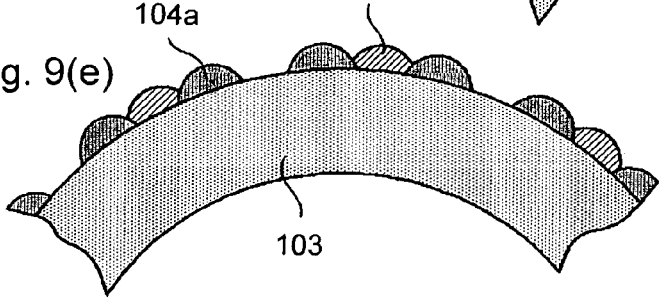
Figure 9F:
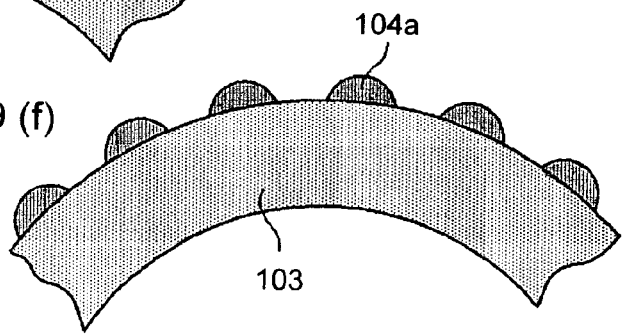

Further, on the anode side, a structure, in which an effect of a thin edge portion can be expected, may be constructed by forming only anode active layer membranes 102a in the strip shape as shown in FIG. 8(e).

Further, on the anode side, it is also possible to form the collector membrane in an either shape of a continuous membrane or a strip-shaped membrane and to compose the anode active layer of a coated membrane formed by thinly applying an organic coating containing Ni fine powder (preferably 1 μm or less). Since the collector membrane with the active layer (Ni fine powder) can be used without being sintered in a fuel side atmosphere at a power generating temperature, the structure of the collector membrane is considerably effective to improve the gas permeability although it is a simple structure.

(Cathode Side or Air Electrode Side)

FIGS. 9(a) to 9(f) are partial sectional views showing examples of the arrangement of the cathode according to the present invention (drawings of the base tube and the anode are omitted). It is premised here that YSZ is used to the electrolyte membrane, an oxide material (an LaMnO$_3$ or LaCoO$_3$ material) is used to the cathode active layer membrane 104$a$, and an NiCrAlY material is used to the cathode collector membrane 102$c$.

When the cathode is made of an electrode membrane having a continuous structure, the gas permeable performance of the overall electrode is deteriorated when sintering and oxidation proceeds. In particular, the gas permeable performance is liable to be deteriorated by the sintering and the oxidation occurring in the collector membrane of the cathode.

The active layer of the cathode is unlike to be sintered because it is formed of the oxide material and further can be made considerably thin (0 to 30 μm) because a current lead function is performed by the collector membrane. Thus, a problem of deterioration due to the sintering does not arise in the cathode active layer. However, since the collector membrane is formed somewhat thick (100 to 200 μm) to obtain an electric conductivity because it is used as a current lead, when it is sintered, the gas permeability is adversely affected. To cope with this problem, cathode collector membranes 104$c$ are formed in a thin strip shape at intervals as shown in FIG. 9($a$) (in this example, the cathode active layer membrane 104$a$ is formed as a continuous membrane which makes a round of the electrolyte membrane). With this arrangement, even if the collector membrane is sintered, the overall membranes are not adversely affected thereby, and thus a gas can be caused to pass through the intervals, thin edges, and the like.

FIGS. 9($b$) to 9($e$) show examples in which the cathode active layer membranes 104$a$ are also formed in the strip shape (line shape), in addition to the cathode collector membranes 104$c$. When the cathode active layer membranes 104$a$ are formed as the strip-shaped membranes, effects can be expected in both the aspects of acceleration of a reaction at the ends of the active layer membrane patterns and material saving. FIG. 9($b$) shows an example in which each of the cathode active layer membranes 104$a$ is formed in the strip shape and each of the cathode collector membranes 104$c$ is formed thereon to cover it. FIG. 9($c$) shows an example in which each cathode active layer membrane 104$a$ is formed in the strip shape, and each cathode collector membrane 104$c$ is formed on a part thereof to overlap it in the strip shape likewise the cathode collector membrane. In the example shown in FIG. 9($d$), the cathode collector membranes 104$c$ are formed to bury the portions between the cathode active layer membranes 104$a$ formed in the strip shape. Further, in FIG. 9($e$), each cathode collector membrane 104$c$ is formed to bury the portion between two cathode active layer membranes 104$a$ formed in the strip shape. In the examples shown in FIGS. 9($b$), 9($c$), and 9($e$), there exist regions in which no electrode is formed, and the solid electrolyte membrane 103 is exposed in the regions. In the regions in which the electrolyte membrane 103 is exposed, a restraint membrane and an electrolyte membrane, which are formed later, form the joint of ceramic membranes, thereby very strong bonding can be realized. When any countermeasure is not taken in a state in which the electrode membrane does not make a round of the circumference in a strip shape and is not closed, there is a possibility that it is easily exfoliated due to an insufficient bonding strength. In the present invention, however, the cathodes (104$a$ and 104$c$) are pressed by the restraint membrane having the strong bonding strength, an exfoliation resistant property is rather enhanced conversely.

Further, when a particular electrode material, that is, a material having a high electric conductivity and a high active effect (for example, an LaCoO$_3$ material) is used to the cathode, a single layer membrane structure composed of the cathode active layer membranes 104$a$ can be employed without forming the collector membranes as shown in FIG. 9($f$). In this case, an effect that the edge portions of the cathode active layer membrane 104$a$ are made thin can be utilized as well as an exfoliation preventing effect can be expected by the combination of the cathode active layer membranes 104$a$ and the restraint membrane.

Next, variations of the electrode membranes (collector membranes and active layer membranes) of the tubular fuel cell of the present invention will be explained with reference to FIGS. 10($a$) to 10($d$) and FIGS. 11($a$) to 11($c$). In FIGS. 10($a$) to 10($d$) and FIGS. 11($a$) to 11($c$), since the respective electrode membranes can be used to any of the anode and the cathode, and to any of the collector membrane and the active layer membrane, the following explanation will be made as to the anode collector membrane 102$c$ for convenience. However, it must be understood that the respective electrode membranes can be applied to any other electrode membranes in principle. In FIGS. 10($a$) to 10($d$) and FIGS. 11($a$) to 11($c$), the same portions as those shown in FIGS. 7($a$) to 7($c$) are denoted by the same reference numerals and the explanation thereof is appropriately omitted. In the example shown in FIG. 10($a$), the anode collector membrane 102$c$ has strip-shaped portions and annular portions formed at both the ends of the strip-shaped portions. In the example shown in FIG. 10($b$), the strip-shaped portions of the anode collector membrane 102$c$ shown in FIG. 10($a$) are formed in a wave shape. In the example shown in FIG. 10($c$), both the strip-shaped portions and the annular portions of the anode collector membrane 102$c$ shown in FIG. 10($a$) are formed in the wave shape. In the example shown in FIG. 10($d$), an annular portion is also formed at the center of the strip-shaped portions of the anode collector membrane 102$c$ shown in FIG. 10($a$).

Figure 11A:
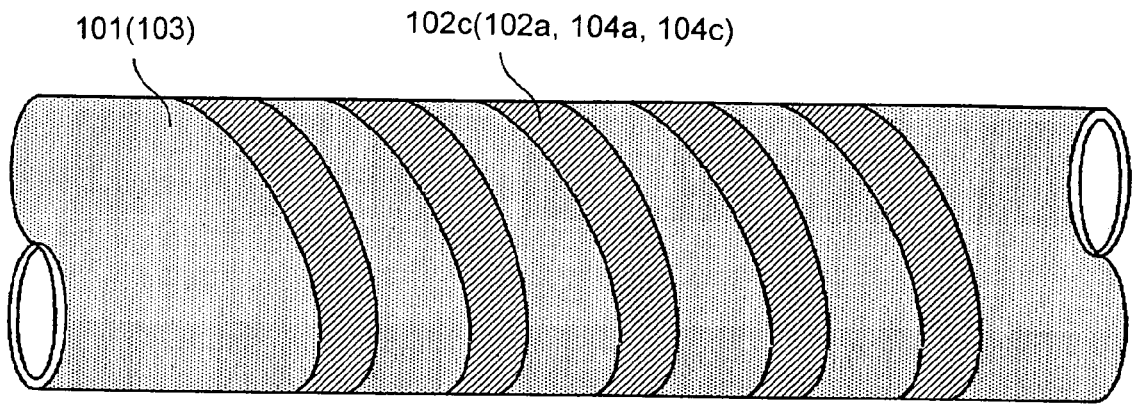
FIGS. 11(a) to 11(c) are perspective views showing various modes of the electrode membrane of the present invention.
Figure 11B:
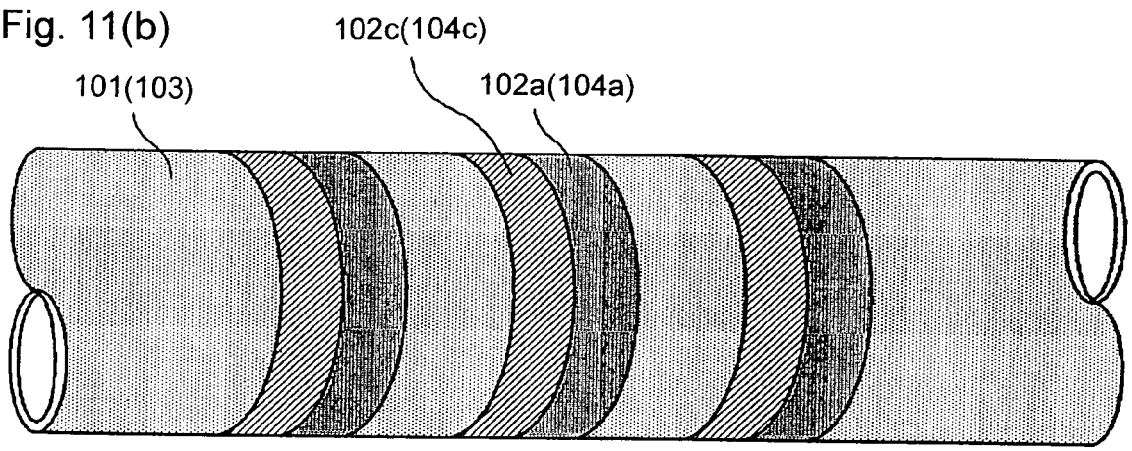
Figure 11C:
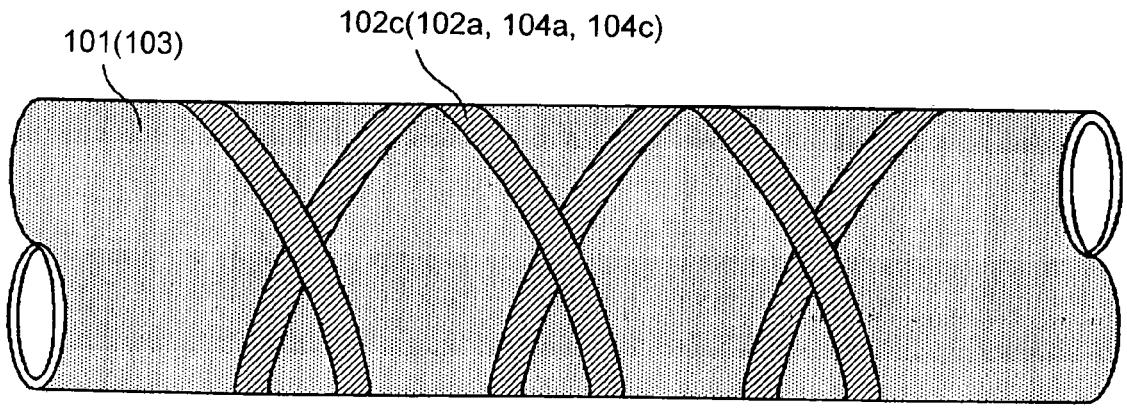

In the example shown in FIG. 11($a$), the anode collector membrane 102$c$ is formed around the base tube 101 in a coil shape. In the example shown in FIG. 11($b$), each anode active layer membrane 102$a$ and each anode collector membrane 102$c$ are formed in the coil shape so as to be in contact with each other. In the example shown in FIG. 11($c$), the two anode collector membranes 102$c$ are formed in the coil shape to intersect with each other.

Next, a method of producing the tubular fuel cell of the present invention will be explained. The fuel cell of the present invention is produced by forming the various membranes on the base tube using such membrane forming methods as a laser spray method, a flame spray method, and a plasma spray method. Of these spray methods, the laser spray method is a maskless membrane forming method which can form any arbitrary relatively thin patterns without using a mask. In contrast, when the flame spray method and the plasma spray method are used, a masking is required. FIGS. 12($a$) and 12($b$) are views explaining a state of a masking when strip-shaped patterns are formed on a tube. When the strip-shaped patterns are formed, a masking plate 110 having holes 111 defined at suitable positions is prepared as shown in FIG. 12($a$) as well as masking bars 112 coupled with each other through coupling strings 113 are disposed around the tube as shown in FIG. 12($b$). For example, a spray source is disposed in front of the masking plate 110 as well as the tube on which membranes are formed is disposed behind the masking plate 110. Then, the tube is rotated in the direction of an arrow as well as the spray source is swung right and left.

Further, when a continuous, tubular, closed pattern is formed, a spray is performed while rotating the tube disposed behind the masking plate 110 without covering it with the masking bars 112.

The tubular fuel cell of the present invention can suppress the internal stress generated in the inter-connector portion to a low level. Further, a high temperature solid electrolyte fuel cell having high reliability, a long life, and high effectiveness in energy conversion, in which occurrence of exfoliation and cracks are suppressed, can be provided by suppressing the resistance in the inter-connector portion.

The tubular fuel cell of the present invention can prevent deterioration of the power generating performance of the cell due to clogging of the electrodes caused by the sintering, and the like as well as can suppress exfoliation and cracks of the electrodes.

According to the present invention, the inter-connector structure is comprised of a first porous inter-connector membrane extending from the fuel electrode, a second porous inter-connector membrane extending from the air electrode, and an intermediate inter-connector membrane sandwiched between the first and second porous inter-connector membranes. According to the above structure, since the electric conduction of the intermediate inter-connector membrane is performed in a vertical direction, the thickness of the intermediate inter-connector membrane can be reduced in the range in which gas tightness can be maintained (about 20 to 300 μm). When the thickness of the intermediate inter-connector can be reduced, even if an alloy material having a thermal expansion coefficient different from that of the electrolyte is used, the internal stress to be generated can be suppressed to a low level. The reduction in thickness of the intermediate inter-connector membrane can reduce the electric resistance of the cell connecting portion. Further, the reduction in thickness of the intermediate inter-connector membrane makes it possible to use the oxide electrically conductive material, such as $LaCrO_3$ or the like. That is, the resistance value of the cell connecting portion can be suppressed to a low level even if the oxide electrically conductive material is used to the intermediate inter-connector membrane.

According to the inter-connector structure of the present invention, the peripheral portion of the intermediate inter-connector membrane (that is, the region excluding the connecting portions which connects to the second porous inter-connector membrane) can be pressed by the electrolyte membrane. When the intermediate inter-connector membrane is formed of the alloy material, for example, NiCrAlY or the like, the intermediate inter-connector membrane which comprises a material having a large thermal expansion coefficient is pressed by an oxide having a small thermal expansion coefficient, so that a possibility of exfoliation of the inter-connector membrane can be more reduced.

According to the present invention, a multi-layer structure composed of a dense membrane, a porous membrane, and dense membrane and the like, can be employed as the inter-connector membrane inserted between the first and second porous inter-connector membranes. According to this structure, the buffer membrane is inserted between the dense membranes, and further the dense membranes are separated from each other to disperse the stress, thereby an inter-connector having higher durability can be realized. Since the intermediate inter-connector membrane is divided, the function thereof can be dispersed to these membranes, so that the range of selection of materials can be increased. That is, it is possible, for example, to form the fuel side dense membrane of a material having high resistance to reduction and to form the air side dense membrane of a material having high resistance to oxidation. It is possible to reduce the resistance value of the inter-connector portion by forming both the fuel and air side dense membranes of an alloy, such as NiCrAlY or the like. However, it is also possible to secure resistance to reduction on the fuel side by forming the fuel side dense membrane of NiCrAlY and to increase the resistance to oxidation on the air side by forming the air side dense membrane of $LaCrO_3$.

In the present invention, the collector membrane acting as a current passage, and the active layer membrane for reaction are formed as separate membranes, respectively. As a result, the active layer membrane need not act as a current passage thereby the thickness of the active layer membrane can be greatly reduced to a degree in which it is not sintered. Since the membrane used as the current passage, that is, the material of the collector membrane need not achieve an active effect, any convenient material other than that of the active layer membrane can be selected. Since the collector membrane can be formed to a thin pattern, even if it is sintered, the adverse effect thereof can be suppressed.

Further, as shown in FIG. 7(*b*), the base tube is in direct contact with the electrolyte membrane or the electrolyte membrane is in direct contact with a protection membrane (not shown, in the specification of the present application, the protection membrane formed on the cathode is formed as a membrane having a function as the "restraint membrane") in the void portions where neither the active layer membrane nor the collector membrane is formed. The base tube, the electrolyte membrane, and the protection membrane (restraint membrane) firmly binds with each other because they are composed of ceramics. When the active layer membrane and the collector membrane are formed at intervals, there may be a case in which these electrode membranes are not formed to make a round on the circumference and are not closed. In this case, there is a possibility that the exfoliation occurs because the binding force thereof with the base is reduced. However, even if they are not formed to make the round around the circumference and are not closed, the active layer membrane and the collector membrane formed at the intervals are pressed by the electrolyte membrane and the protection membrane which firmly binds with each other in the intervals, so that the exfoliation thereof is prevented. In relation to the above-mentioned, it is preferable that the base tube, the electrolyte membrane, and the protection membrane laminated in this order from an inside have thermal expansion coefficients which are smaller in this order. Since the respective layers are pressed from thereabove, exfoliation of the electrode membranes can be suppressed. Because of the reason described above, it is meaningful to construct a structure in which the metal membrane base tube is covered with an insulation membrane. Further, when the electrodes are separately formed as mentioned above, it is possible to reduce thermal stress applied to the electrodes due to differences between the thermal expansion coefficient of the electrodes and those of the base tube and the electrolyte membrane. Accordingly, the electrodes are pressed by the electrolyte membrane and the protection membrane from an upper layer, thereby cracks and exfoliation occurring in the electrode membranes can be easily prevented. Further, when the electrodes are separately formed, many thin portions are formed to the edges of the active layer membrane and contribute to a reaction having high gas permeable performance, thereby a power generating efficiency can be enhanced.

Further, according to the present invention, at least a part of the electrode membranes of the anode active layer membrane, the anode collector membrane, the cathode active layer membrane, and the cathode collector membrane is formed by the laser spray. Although it is difficult for the ordinary spray methods, such as the flame spray method, to form an electrode membrane having a thin pattern, the electrode having the thin pattern as shown in FIG. 7(b) can be easily formed using the laser spray method.

The present invention will be explained in more detail based on the following examples, but the present invention is by no means limited to these examples. Note that, of the following examples, Examples 1 and 2 relate to the first embodiment, and Examples 3 to 9 relate to the second embodiment.

EXAMPLES

Example 1

Figure 13:
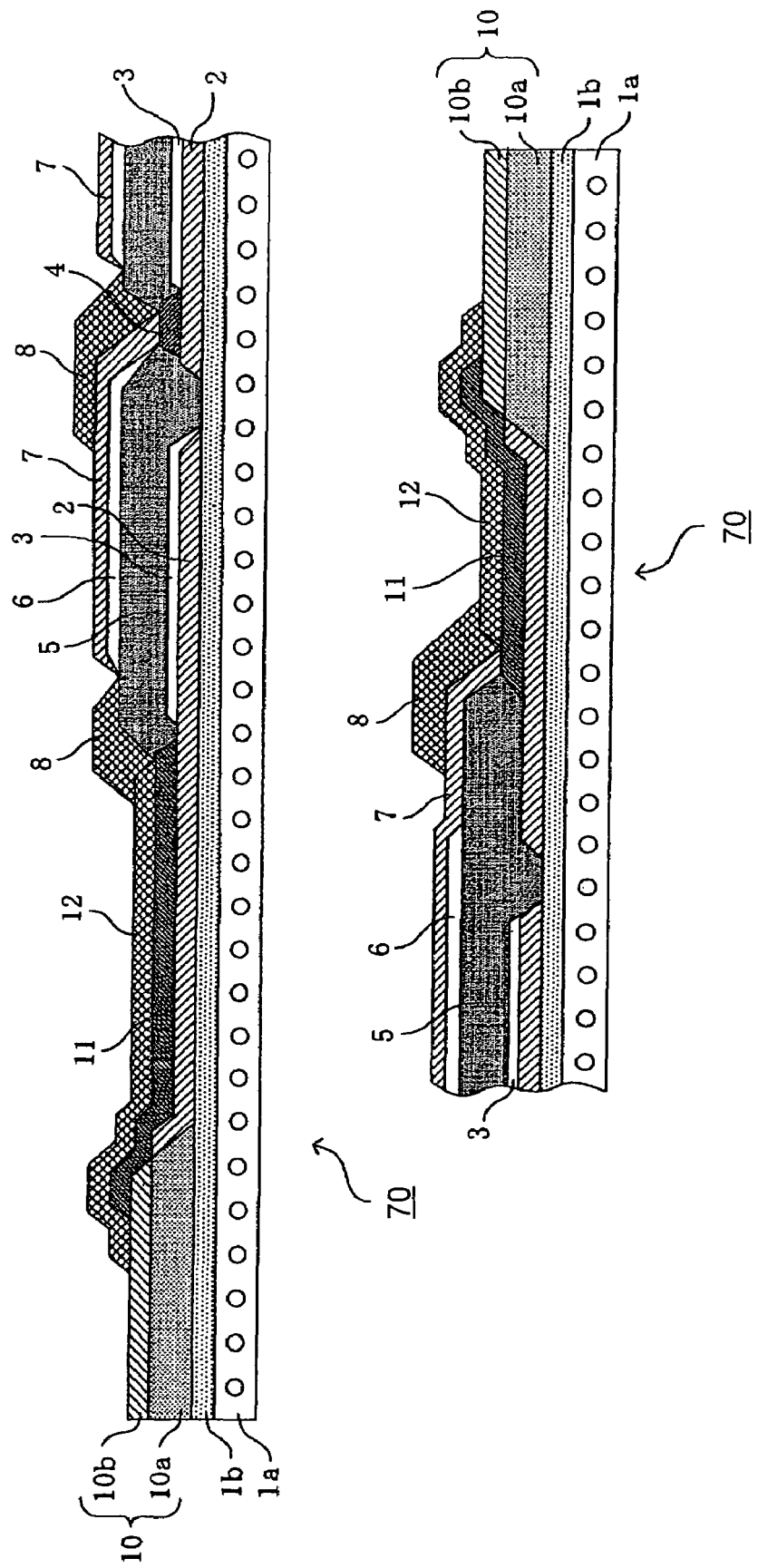
FIG. 13 is a sectional view of a tubular fuel cell of an example 1.

FIG. 13 is a sectional view of the example 1 of the present invention. In FIG. 13, views to be originally disposed right and left are shown in upper and lower rows. FIG. 13 is a view which is originally disposed so as to confront the wave line of the upper view with the wave line of the lower view. A base tube 1 is formed of a porous alloy membrane 1a comprised of a NiCrAlY sprayed membrane and having a thickness of 350 μm and a porous ceramic membrane 1b comprised of an alumina sprayed membrane and having a thickness of 250 μm. The base tube 1 has an outside diameter of 20 mmφ and a length of 200 mm.

Terminals 10 each comprised of a terminal porous membrane 10a and a terminal dense membrane 10b were formed at both the ends of the base tube 1 by spraying NiCrAlY, subsequently a porous metal IC membrane 2 was formed by spraying NiCrAlY, and further a lead dense membrane 11 and a dense metal IC membrane 4, which were connecting portions to a cell and the terminals 10, were formed by spraying NiCrAlY. Next, a fuel electrode 3 was formed by spraying NiO, and subsequently a solid electrolyte membrane 5 was formed by spraying YSZ. Further, an air electrode 6 was formed by spraying LaMnO$_3$, and a porous metal IC membrane 7 was formed to cover the air electrode 6 by spraying NiCrAlY. Thereafter, a protection membrane 12 comprised of an alumina dense membrane was formed by spraying, and finally a porous exfoliation preventing membrane 8 was formed by spraying alumina, so that a lateral stripe tubular SOFC 70 comprised of three cells was produced.

Figure 14:
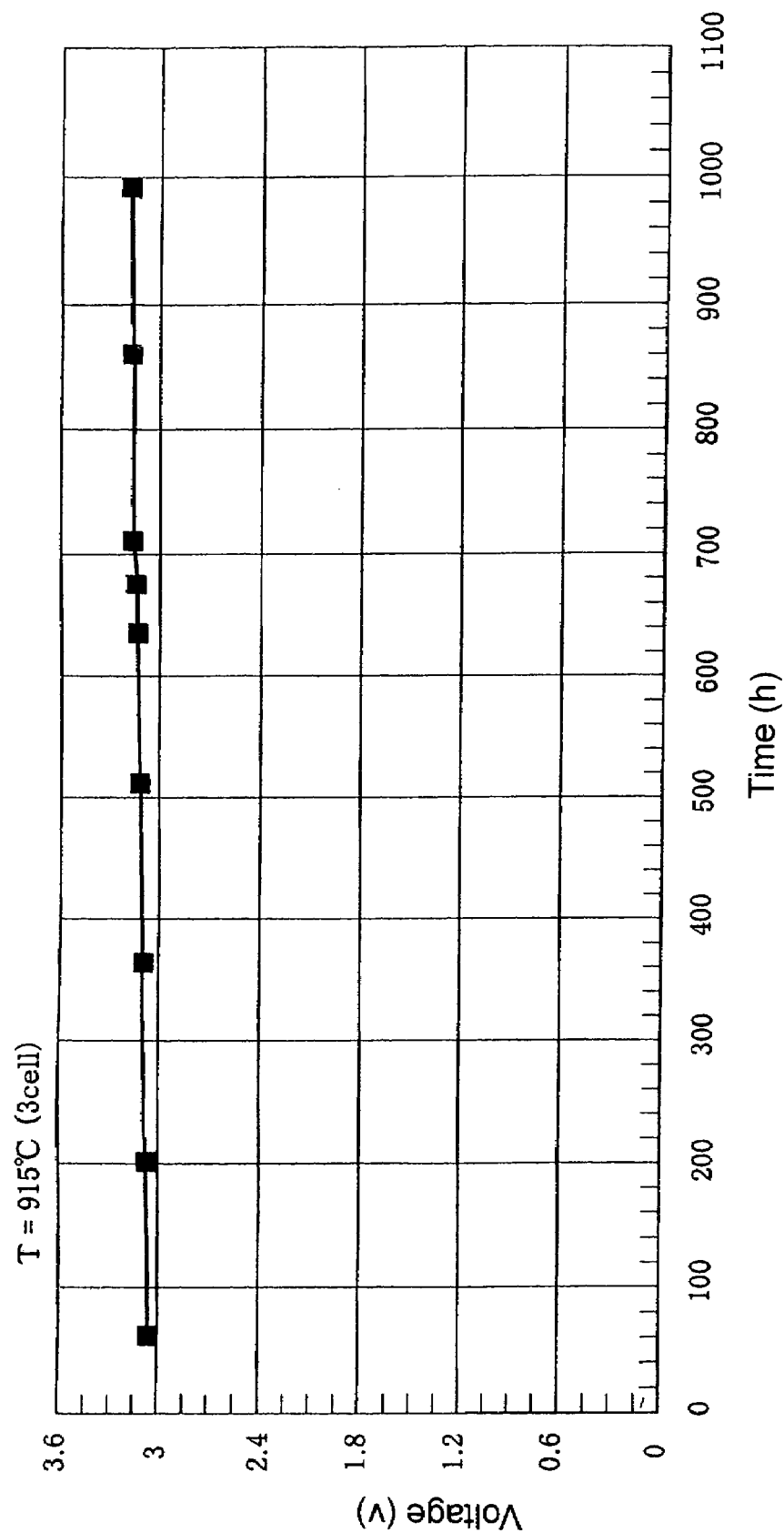
FIG. 14 is a graph showing a result of a test without a load executed in the example 1.

FIG. 14 is a graph showing a result of a no load test of a SOFC obtained in the example 1. A horizontal axis shows an elapsed time after a temperature is increased to 915° C. The temperature was kept constant at 915° C. As can be found from the figure, a voltage slightly increases as a time elapses. It is assumed that this results from that the gas tight property of the dense metal IC membrane 4 increases as the time elapses. A high value of 1.047 V could be obtained as a voltage per unit cell after 990 hours had elapsed, so that the SOFC having excellent characteristics without leakage of a gas could be realized.

Figure 15:
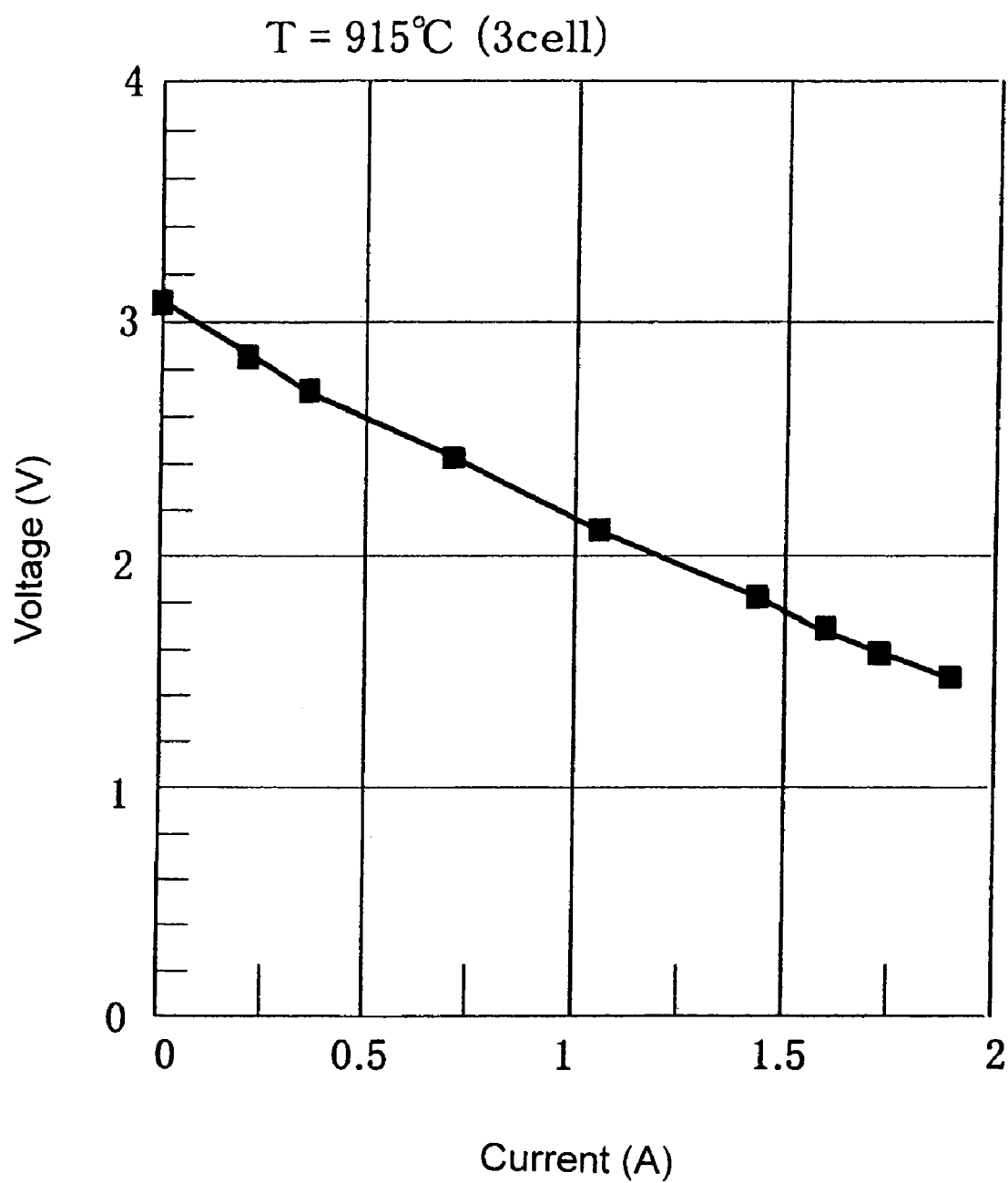
FIG. 15 is a graph showing a result of a test with a load executed in the example 1.

FIG. 15 is a graph showing a result of a load test of the SOFC obtained in Example 1. A temperature is constant at 915° C.

Conventionally, the high temperature solid fuel cell is formed mainly of an oxide (ceramic) as can be found from its name "SOFC". In this example, however, it is mainly formed of an alloy which is cheaper than the ceramic. Accordingly, the high temperature solid fuel cell according to the present invention can be called an alloy high temperature solid fuel cell in contrast that the conventional high temperature solid fuel cell is called a ceramic high temperature solid fuel cell.

Example 2

Figure 16:
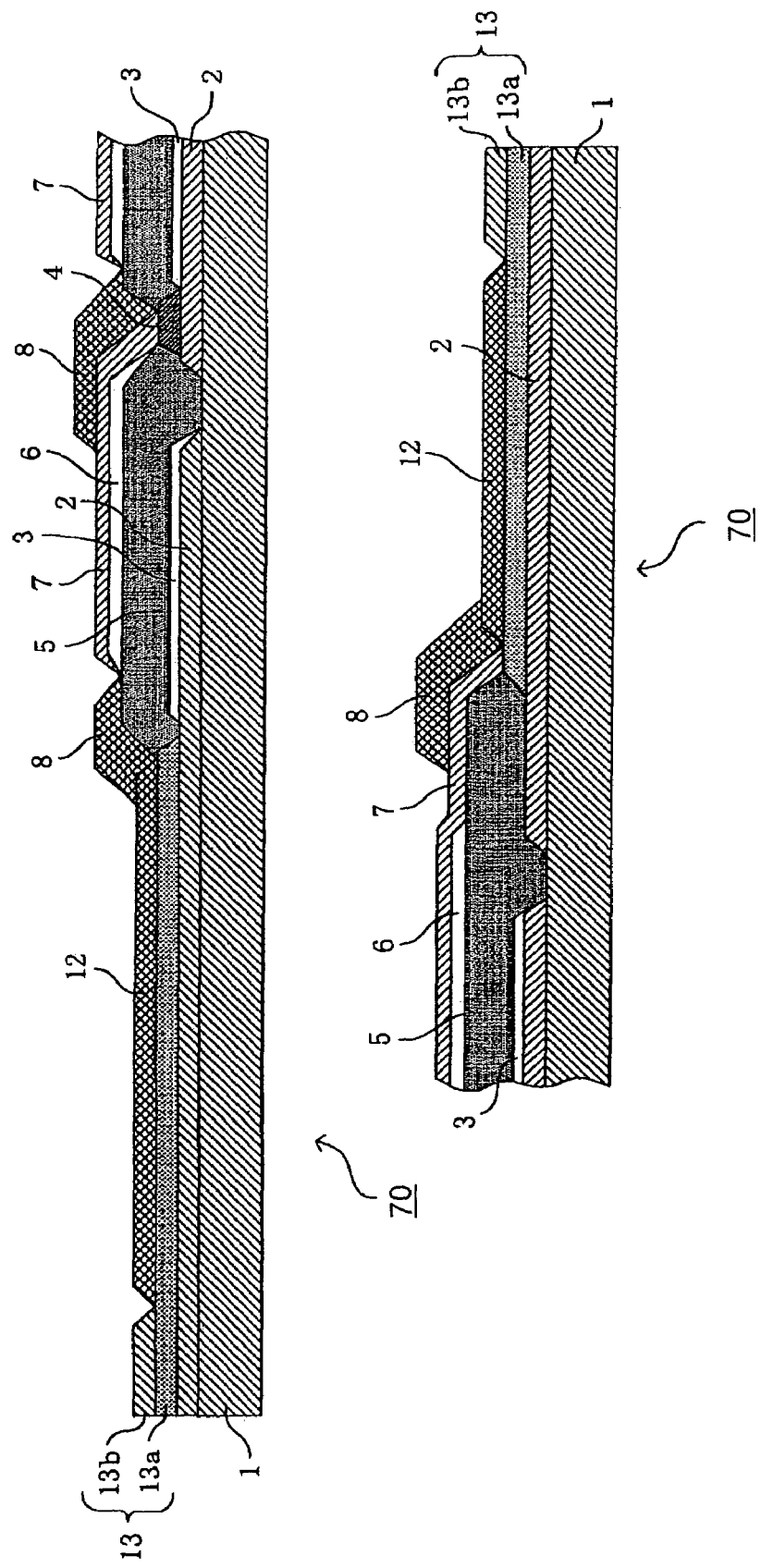
FIG. 16 is a sectional view of a tubular fuel cell of an example 2.

FIG. 16 is a sectional view of Example 2 of the present invention. In FIG. 16, views to be originally disposed right and left are shown in upper and lower rows. FIG. 16 is a view which is originally disposed so as to confront the wave line of the upper view with the wave line of the lower view. A ceramic tube having an outside diameter of 20 mmφ and a length of 200 mm was used as a base tube 1. First, a porous metal IC membrane 2 was formed by spraying NiCrAlY, and further a dense metal IC membrane 4 and a terminal lead dense membrane 13a, which formed a part of each of terminal leads 13 were formed by spraying NiCrAlY likewise. Next, a fuel electrode 3 was formed by spraying NiO, and subsequently a solid electrolyte membrane 5 was formed by spraying YSZ. Further, an air electrode 6 was formed by spraying LaMnO$_3$, a porous metal IC membrane 7 was formed to cover the air electrode 6 by spraying NiCrAlY, and a terminal lead porous membrane 13b, which formed a part of each terminal lead 13, was formed at each end of the base tube 1. Thereafter, a protection membrane 12 composed of an alumina dense membrane was formed by spraying, and finally a porous exfoliation preventing membrane 8 was formed by spraying alumina, so that a lateral stripe tubular SOFC 70 composed of three cells was produced.

Example 3

FIGS. 17(a) and 17(b) are a sectional view and a perspective view of Example 3. As shown in FIGS. 17(a) and 17(b), a porous anode collector membrane 102c comprised of NiCrAlY and the like was formed on a base tube 101, and a porous anode active layer membrane 102a comprised of Ni and NiO is formed on the anode collector membrane 102c. Further, a dense membrane inter-connector 105 comprised of NiCrAlY and the like is formed on the anode collector membrane 102c. A dense solid electrolyte membrane 103 comprised of YSZ is formed on the anodes (102c and 102a) so as to expose the surface of the inter-connector 105, and a porous inter-connector 106, which has an end connected to the inter-connector 105 and is comprised of NiCrAlY and the like, is formed on the dense solid electrolyte membrane 103. A porous cathode active layer membrane 104a comprised of LaMnO$_3$ and the like is formed on the solid electrolyte membrane 103, and a porous cathode collector membrane 104c, which has an end connected to the porous inter-connector 106 and is formed of NiCrAlY, and the like, is formed on the cathode active layer membrane 104a.

In FIGS. 17(a) and 17(b), the respective membranes are continuously formed in a tubular shape. As a modification of Example 3, any one or both of the anode collector membrane 102c and the cathode collector membrane 104c may be formed in a strip shape (line shape).

Note that a CSZ tube, an alumina tube, a base tube composed of a metal membrane base proposed in Japanese Patent Application No. 2003-303830 or the like, can be used as the base tube 101.

Example 4

Figure 18A:
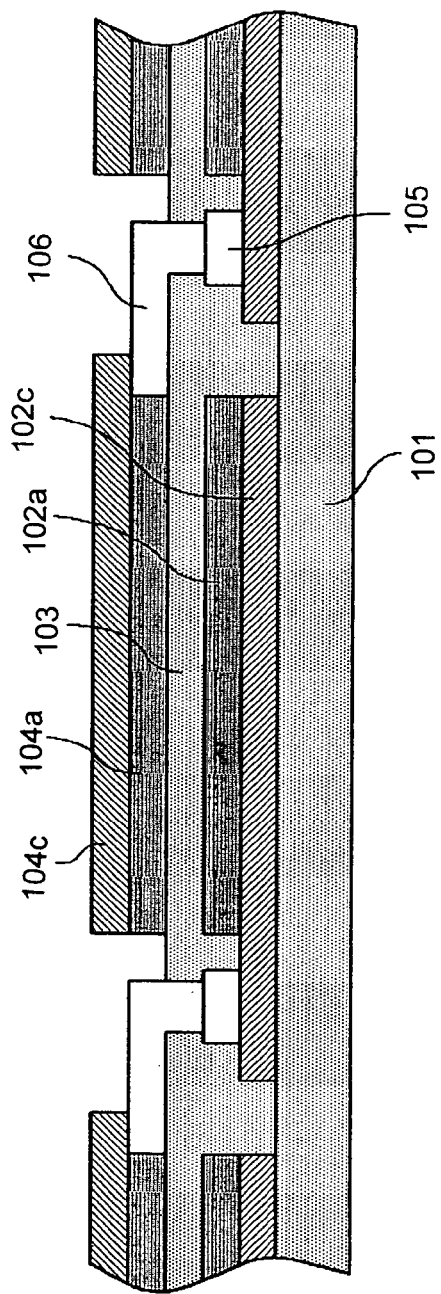
FIG. 18(a) is a sectional view of a tubular fuel cell of an example 4.
Figure 18B:
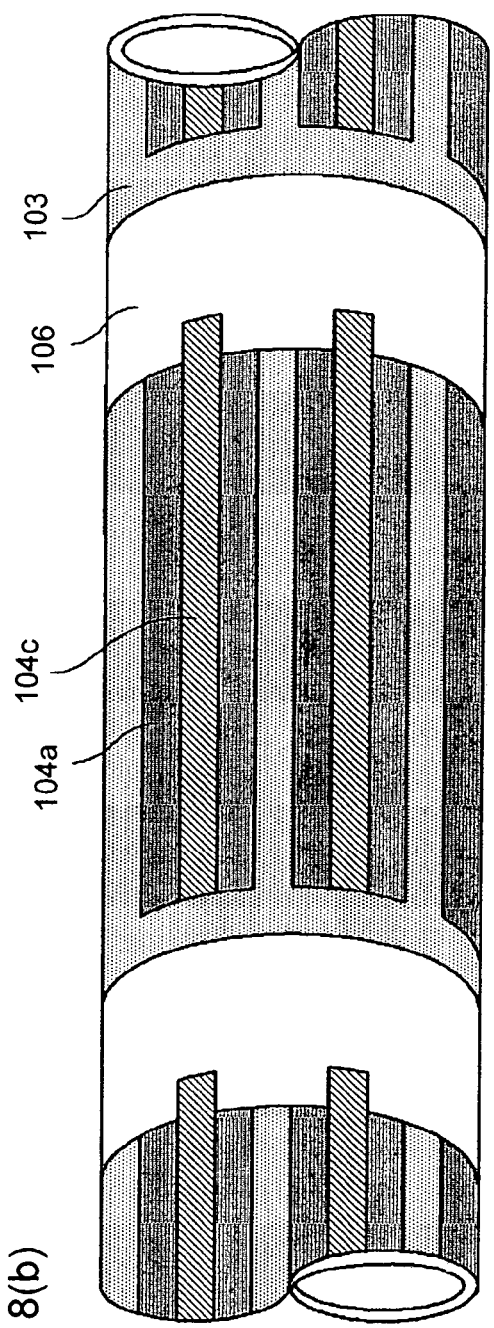
FIG. 18(b) is a sectional view of a tubular fuel cell of an example 4.

FIGS. 18(a) and 18(b) are a sectional view and a perspective view of Example 4. In FIGS. 18(a) and 18(b), the same portions as those of Example 3 shown in FIGS. 17(a) and 17(b) are denoted by the same reference numerals, and the duplicate explanation thereof is omitted. In this example, a solid electrolyte membrane 103, an inter-connector 105, and a porous inter-connector 106 are formed as tubular-shaped continuous membranes in the same manner as in Example 3. However, an anode collector membrane 102c, an anode active layer membrane 102a, a cathode active layer membrane 104a, and a cathode collector membrane 104c are formed in a strip shape (line shape), respectively.

As a modification of Example 4, any one or both of the anode active layer membrane 102a and the cathode active layer membrane 104a may be continuously formed in a tubular shape.

Example 5

FIGS. 19(a) and 19(b) are a sectional view and a perspective view of Example 5. In Example 5, a porous restraint membrane 107 for preventing exfoliation is formed to cover all the cells connected in series as shown in FIGS. 19(a) and 19(b), and a restraint membrane 108 is further formed on the porous restraint membrane 107. The porous restraint membrane 107 achieves a function for pressing a cathode active layer membrane 104a and a cathode collector membrane 104c on an electrolyte membrane 103. With this arrangement, exfoliation and cracks of the cathodes (104a and 104c) occurring due to a difference between the thermal expansion coefficient of the cathodes and that of the electrolyte membrane 103 can be suppressed. In contrast, the electrolyte membrane 103 also achieves a function for pressing an anode collector membrane 102c and an anode active layer membrane 102a on a base tube 101. To permit the porous restraint membrane 107 and the electrolyte membrane 103 to achieve the function for pressing, it is important to select materials which satisfy the following condition.

$$\alpha(tube) \geq \alpha(electrolyte) \geq \alpha(restraint)$$

wherein α (tube), α (electrolyte), and α (restraint) show the thermal expansion coefficients of the base tube 101, the electrolyte membrane 103, and the porous restraint membrane 107, respectively. The above condition can be satisfied by forming the base tube of CSZ, the electrolyte membrane of YSZ and the porous restraint membrane of alumina ($Al_2O_3$). Otherwise, a restrain force can be more increased by using the base tube comprised of a metal membrane base. The restraint membrane 108 formed on the porous restraint membrane 107 is formed to reinforce the restraint force of the porous restraint membrane 107 and formed on a non-power generating region as a dense membrane using, for example, alumina, or a membrane having a porous property smaller than that of the porous restraint membrane 107.

As described above, although the anode collector membrane 102c and the anode active layer membrane 102a are pressed to the base tube 101 by the electrolyte membrane 103, there is a possibility that an insufficient restraint force is applied only by the electrolyte membrane 103. In this case, the electrolyte membrane 103 may be covered with porous or dense restraint membranes comprising alumina or the like in the appropriate regions thereof.

Note that a cell structure formed under the restraint membranes 107 and 108 may be any structure in Examples 3 or 4 (FIGS. 17(a) and 17(b), and FIGS. 18(a) and 18(b)).

Example 6

FIGS. 20(a) and 20(b) are a sectional view and a perspective view of Example 6. In this example, a porous restraint membrane 107 is formed to cover respective cells (that is, power generating regions) as shown in FIGS. 20(a) and 20(b), and a restraint membrane 108 is formed to cover the connecting regions (that is, non-power generating regions) between the cells. Since the restraint membranes 107 and 108 are formed of the same materials as those of Example 5, the same effects as those of the example 5 can be expected also in Example 6.

Example 7

Figure 21A:
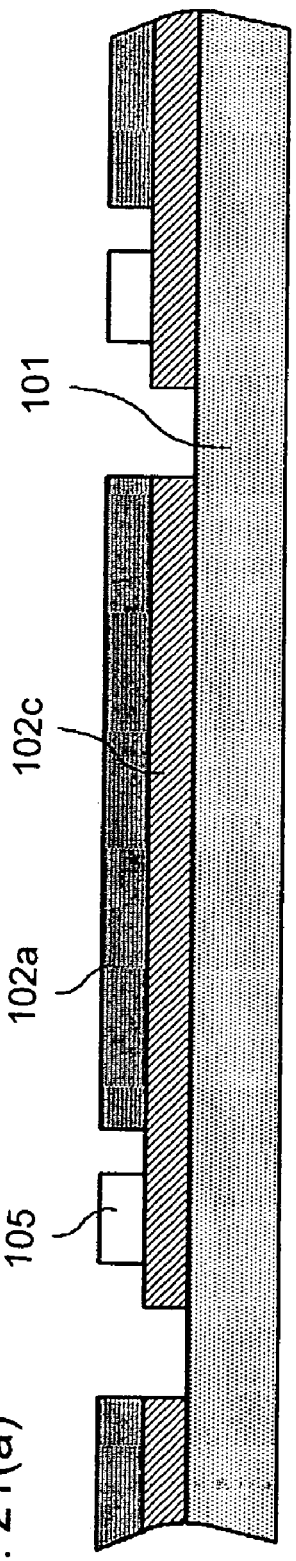
FIGS. 21(a) and 21(b) are a sectional view and a perspective view explaining a method of producing the tubular fuel cell of an example 7.
Figure 21B:
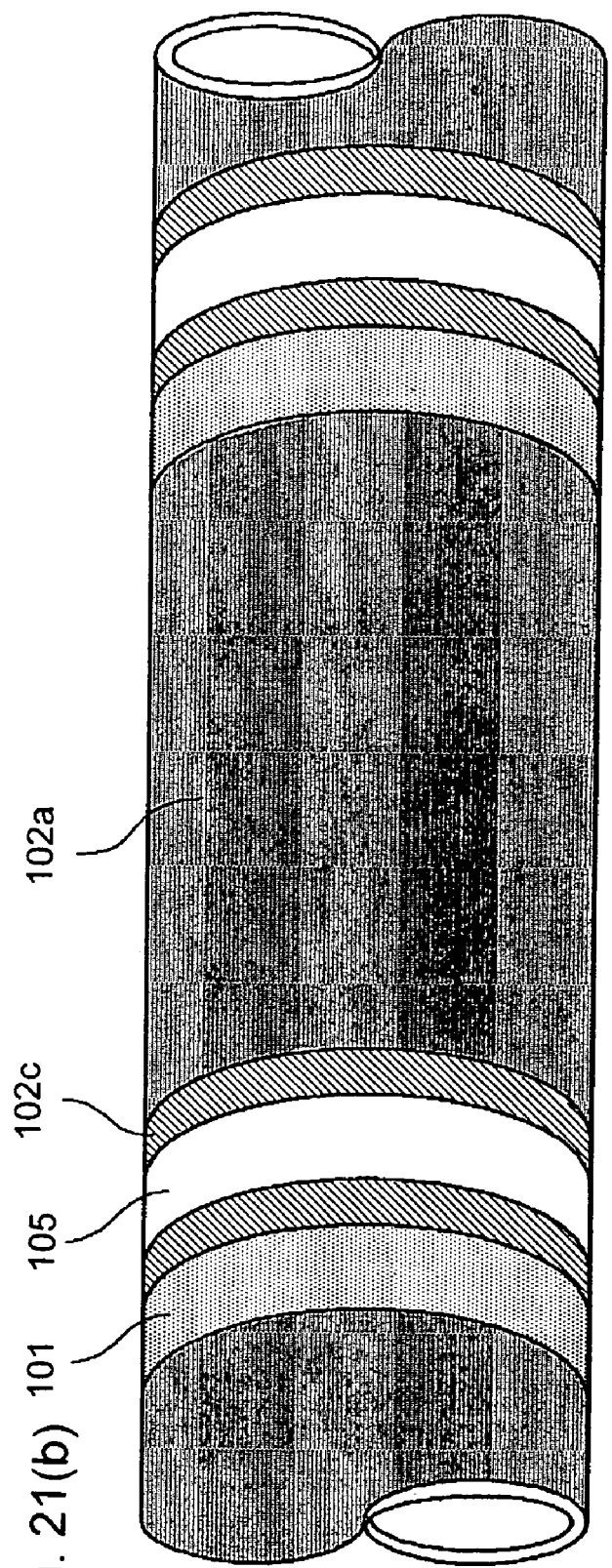

FIGS. 21(a) and 21(b) are a sectional view and a perspective view showing a process for producing the tubular fuel cell of Example 3 shown in FIGS. 17(a) and 17(b) at a middle step. First, an anode collector membrane 102c is formed by spraying NiCrAlY to a base tube 101 according to a flame spray method through a masking plate. Then, an organic solution containing Y is applied and a heat treatment is conducted in an oxidizing atmosphere, to thereby improve resistance to the oxidation. Subsequently, the masking plate is replaced, and an anode active layer membrane 102a is formed by spraying NiO to the anode collector membrane 102c by the flame spraying method. The masking plate is replaced again, and an inter-connector 105 acting as a dense NiCrAlY membrane is formed on the anode collector membrane 102c by a plasma spray method. Further, the tubular fuel cell of Example 3 shown in FIGS. 17(a) and 17(b) is produced by repeating the spray through the mask. That is, a solid electrolyte membrane 103 is formed by spraying YSZ by the plasma spraying method, a porous inter-connector 106 is formed by spraying NiCrAlY by the flame spraying method, a cathode active layer membrane 104a is formed by spraying $LaMnO_3$ by the flame spraying method, and a cathode collector membrane 104c is formed by spraying NiCrAlY by the flame spraying method. Then, an organic solution containing Y is applied and the heat treatment is conducted in an oxidizing atmosphere, to thereby improve resistance to the oxidation.

Example 8

FIGS. 22(a) and 22(b) are a sectional view and a perspective view showing a process for producing the tubular fuel cell of Example 4 shown in FIGS. 18(a) and 18(b) at a middle step. First, an anode collector membrane 102c is formed by spraying NiCrAlY on a base tube 101 through a masking plate according to a flame spraying method, a heat treatment is performed by coating an organic solution containing Y in an oxidizing atmosphere, and then a strip-shaped anode active layer membrane 102a is formed on the anode collector membrane 102c by spraying NiO according to a laser spraying method. An inter-connector 105 acting as a dense NiCrAlY membrane is formed on the anode collector membrane 102c by the plasma spray method through the masking plate again. Next, as shown in FIGS. 18(a) and 18(b), a solid electrolyte membrane 103 is formed by spraying YSZ according to the plasma spraying method through a masking plate, and a porous inter-connector 106 is formed by spraying NiCrAlY according to the flame spraying method through another masking plate. Thereafter, a cathode active layer membrane 104a is formed in a strip shape by spraying $LaMnO_3$ according to the flame spraying method, and further a cathode collector membrane 104c whose one end is connected to the porous inter-connector 106 is formed in a strip shape by spraying NiCrAlY according to the flame spraying method. Then, a heat treatment is performed in an oxidizing atmosphere by coating an organic solution containing Y.

Figure 23:
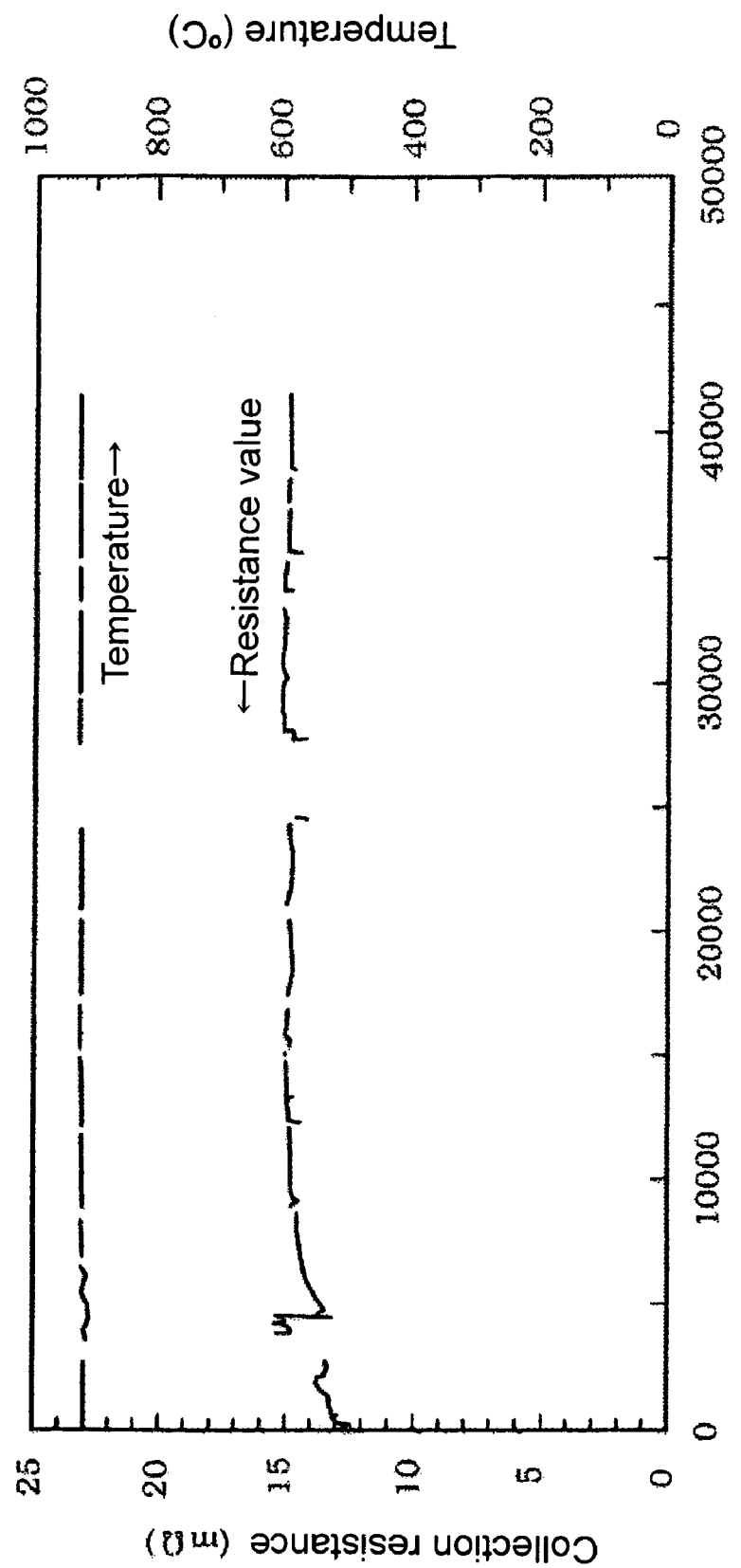
FIG. 23 is a graph showing a result of experiment executed to an electrode membrane simulating a cathode of the tubular fuel cell produced in an example 8.
Figure 24:
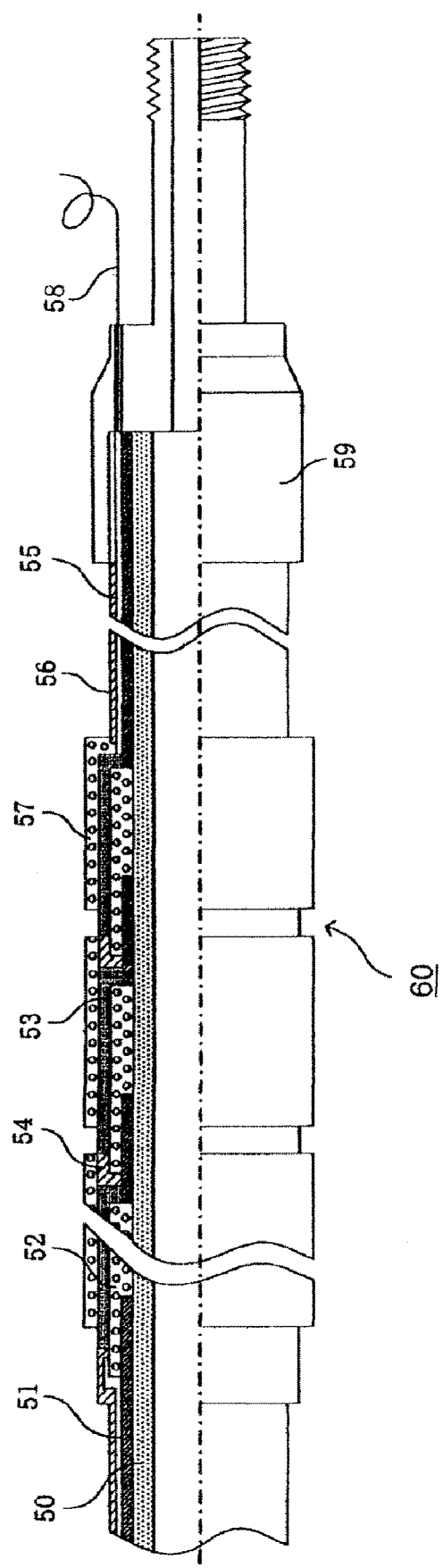
FIG. 24 is a front elevation view showing a conventional lateral stripe tubular solid electrolyte fuel cell with its upper half portion in cross section.

Note that, to confirm the stability of a $LaMnO_3$ membrane and a NiCrAlY membrane as a simple body, a cathode laminated portion was produced by simulation and the connecting portion thereof was tested. In the test, the change of a resistance value was measured by measuring a terminal voltage by supplying a predetermined current to a laminated interface, thereby the deteriorating state of the connecting portion of the interface was observed. FIG. 23 shows a result of the test. It could be confirmed that a sufficient durability (stability) was secured at the operating temperature (915° C.) of an alloy cell in the atmosphere. It could be confirmed from the result that the laminated portion could be used for a long period of time because a resistance did not almost increase in the interface of the laminated portion.

Having described our invention as related to the present embodiments, it is our intention that the invention not be limited by any of the details of the description, unless otherwise specified, but rather be construed broadly within its spirit and scope as set out in the accompanying claims.

I claim:

1. A tubular fuel cell in which each of cells comprises a first porous inter-connector membrane, a first electrode, a solid electrolyte membrane, a second electrode, and a second porous inter-connector membrane laminated in this order from a lower layer, wherein the first porous inter-connector membrane and the second porous inter-connector membrane between adjacent cells are connected to each other through an intermediate inter-connector membrane that comprises at least one layer composed of a dense electrically conductive membrane;

wherein the intermediate inter-connector membrane comprises a single dense electrically conductive membrane or a porous electrically conductive membrane and an upper layer dense electrically conductive membrane and a lower layer dense electrically conductive membrane between which the porous electrically conductive membrane is sandwiched;

wherein an auxiliary restraint membrane, which comprises a material having a thermal expansion coefficient smaller than that of the first and second porous inter-connector membranes, annularly covers the solid electrolyte membrane while exposing the connecting portion of the single dense electrically conductive membrane or the upper layer dense electrically conductive membrane which portion is connected to the second porous inter-connector membrane.

2. The tubular fuel cell according to claim 1, wherein the auxiliary restraint membrane is a porous alumina membrane.

3. A tubular fuel cell in which each of cells comprises a first porous inter-connector membrane, a first electrode, a solid electrolyte membrane, a second electrode, and a second porous inter-connector membrane laminated in this order from a lower layer, wherein the first porous inter-connector membrane and the second porous inter-connector membrane between adjacent cells are connected to each other through an intermediate inter-connector membrane that comprises at least one layer composed of a dense electrically conductive membrane;

wherein an exfoliation preventing membrane comprising a material having a thermal expansion coefficient smaller than that of the first and second porous inter-connector membranes is formed on the second porous inter-connector membrane so as to cover at least the intermediate inter-connector membrane.

4. The tubular fuel cell according to claim 3, wherein the exfoliation preventing membrane is entirely formed so as to cover all the cells.

5. The tubular fuel cell according to claim 3, wherein that the exfoliation preventing membrane has openings formed at appropriate positions.

6. The tubular fuel cell according to claim 3, wherein the exfoliation preventing membrane is a porous membrane at least on the regions where power is generated.

7. The tubular fuel cell according to claim 3, wherein the exfoliation preventing membrane is formed of alumina.

8. The tubular fuel cell according to claim 1, wherein the auxiliary restraint membrane covers the solid electrolyte membrane at a position above the single dense electrically conductive membrane or the upper layer dense electrically conductive membrane.

9. The tubular fuel cell according to claim 3, wherein the exfoliation preventing membrane is laminated annularly.

* * * * *